US008503957B2

(12) United States Patent
Masamoto

(10) Patent No.: US 8,503,957 B2
(45) Date of Patent: Aug. 6, 2013

(54) RADIO DATA SYSTEM (RDS) DATA PROCESSING METHODS AND APPARATUS

(75) Inventor: James Tadashi Masamoto, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1185 days.

(21) Appl. No.: 11/944,045

(22) Filed: Nov. 21, 2007

(65) Prior Publication Data

US 2009/0131002 A1 May 21, 2009

(51) Int. Cl.
*H04B 1/18* (2006.01)

(52) U.S. Cl.
USPC ..... 455/186.1; 455/3.01; 455/3.02; 455/3.06; 455/343.1; 455/343.2

(58) Field of Classification Search
USPC .......................... 455/3.01–3.06, 343.1–343.6
See application file for complete search history.

(56) References Cited

U.S. PATENT DOCUMENTS

| | | | | |
|---|---|---|---|---|
| 5,239,681 | A | 8/1993 | Parnall et al. | |
| 5,404,588 | A | 4/1995 | Henze | |
| 5,428,825 | A | 6/1995 | Tomohiro et al. | |
| 5,455,570 | A | 10/1995 | Cook et al. | |
| 5,535,442 | A | 7/1996 | Kishi | |
| 5,745,845 | A | 4/1998 | Suenaga et al. | |
| 5,790,958 | A | 8/1998 | McCoy et al. | |
| 6,266,736 | B1 | 7/2001 | Atkinson et al. | |
| 6,909,357 | B1 * | 6/2005 | Bandy et al. | 340/5.65 |
| 6,961,548 | B2 | 11/2005 | Groeger et al. | |
| 7,088,740 | B1 | 8/2006 | Schmidt | |
| 7,356,319 | B2 | 4/2008 | Mason | |
| 2002/0049037 | A1 | 4/2002 | Christensen et al. | |
| 2002/0144134 | A1 | 10/2002 | Watanabe et al. | |
| 2003/0054804 | A1 | 3/2003 | Brandes et al. | |
| 2003/0153292 | A1 * | 8/2003 | Groeger et al. | 455/221 |
| 2004/0198279 | A1 | 10/2004 | Anttila et al. | |
| 2005/0100116 | A1 | 5/2005 | Mason | |
| 2006/0116163 | A1 | 6/2006 | Golightly | |
| 2006/0223467 | A1 | 10/2006 | Mason | |
| 2007/0248055 | A1 | 10/2007 | Jain et al. | |
| 2008/0222295 | A1 | 9/2008 | Robinson et al. | |
| 2008/0288408 | A1 | 11/2008 | Jacobsen | |

(Continued)

FOREIGN PATENT DOCUMENTS

| | | | |
|---|---|---|---|
| CN | 1894874 | A | 1/2007 |
| CN | 1961509 | A | 5/2007 |

(Continued)

OTHER PUBLICATIONS

International Search Report and Written Opinion—PCT/US2008/084392—International Search Authority, European Patent Office—Mar. 12, 2009.

(Continued)

*Primary Examiner* — Fayyaz Alam
(74) *Attorney, Agent, or Firm* — Kevin T. Cheatham

(57) ABSTRACT

A host system for processing radio data system (RDS) data includes a host processor. The host system further includes a data processor configured to receive the RDS data, configured to filter the RDS data to allow the host processor to receive a selected set of the RDS data, and configured to reduce the number of interrupts to the host processor. A method is also provided for processing RDS data within a host system.

27 Claims, 32 Drawing Sheets

U.S. PATENT DOCUMENTS

| | | | |
|---|---|---|---|
| 2009/0104872 | A1 | 4/2009 | Christensen et al. |
| 2009/0129361 | A1 | 5/2009 | Masamoto |
| 2009/0131003 | A1 | 5/2009 | Masamoto et al. |
| 2009/0131122 | A1 | 5/2009 | Masamoto |
| 2009/0239557 | A1 | 9/2009 | Kadakia et al. |
| 2009/0264149 | A1 | 10/2009 | Miller et al. |
| 2010/0114783 | A1 | 5/2010 | Spolar |
| 2010/0283726 | A1 | 11/2010 | Andersson et al. |
| 2010/0332356 | A1 | 12/2010 | Spolar |

FOREIGN PATENT DOCUMENTS

| | | | |
|---|---|---|---|
| EP | 446985 | A1 | 9/1991 |
| EP | 0748073 | A1 | 12/1996 |
| EP | 1536580 | A2 | 6/2005 |
| EP | 1755219 | A2 | 2/2007 |
| GB | 2407223 | | 4/2005 |
| GB | 2409360 | | 6/2005 |
| JP | 1200829 | A | 8/1989 |
| JP | 3165119 | A | 7/1991 |
| JP | 3212029 | A | 9/1991 |
| JP | 4220021 | A | 8/1992 |
| JP | 7058598 | A | 3/1995 |
| JP | 8107368 | A | 4/1996 |
| JP | 10126292 | A | 5/1998 |
| JP | 11122130 | A | 4/1999 |
| JP | 3187108 | B2 | 7/2001 |
| JP | 2004159106 | A | 6/2004 |
| JP | 2007179132 | A | 7/2007 |
| KR | 20060129583 | A | 12/2006 |
| KR | 100740191 | B1 | 7/2007 |
| TW | 578433 | B | 3/2004 |
| TW | I270010 | B | 1/2007 |
| TW | I276325 | B | 3/2007 |
| WO | WO2006058337 | | 6/2006 |
| WO | WO2007062881 | | 6/2007 |

OTHER PUBLICATIONS

Masatake Nagai et al., “Practical Techniques for Built-In OS”, Kyoritsu Shuppan Co., Ltd., 1st ed., Nov. 1, 2001, pp. 199-204.

Taiwan Search Report—TW097145182—TIPO—May, 25, 2012.

* cited by examiner

1100

| Group Type | | Bit | Register |
|---|---|---|---|
| Fast switching information only | 15B | 31 | RDSGFILT3 |
| Fast switching information only (RBDS only) | 15A | 30 | |
| Enhanced Other Networks information only | 14B | 29 | |
| Enhanced Other Networks information only | 14A | 28 | |
| Open Data Applications | 13B | 27 | |
| Enhanced Radio Paging or ODA | 13A | 26 | |
| Open Data Applications | 12B | 25 | |
| Open Data Applications | 12A | 24 | |
| Open Data Applications | 11B | 23 | RDSGFILT2 |
| Open Data Applications | 11A | 22 | |
| Open Data Applications | 10B | 21 | |
| Program Type Name | 10A | 20 | |
| Open Data Applications | 9B | 19 | |
| Emergency Warning System or ODA | 9A | 18 | |
| Open Data Applications | 8B | 17 | |
| Traffic Message Channel or ODA | 8A | 16 | |
| Open Data Applications | 7B | 15 | RDSGFILT1 |
| Radio Paging or ODA | 7A | 14 | |
| In House applications or ODA | 6B | 13 | |
| In House applications or ODA | 6A | 12 | |
| Transparent Data Channels | 5B | 11 | |
| Transparent Data Channels | 5A | 10 | |
| Open Data Applications | 4B | 9 | |
| Clock-time and date only | 4A | 8 | |
| Open Data Applications | 3B | 7 | RDSGFILT0 |
| Applications Identification for ODA only | 3A | 6 | |
| Radio Text Only | 2B | 5 | |
| Radio Text Only | 2A | 4 | |
| Program Item Number | 1B | 3 | |
| Program Item Number and slow labeling codes only | 1A | 2 | |
| Basic tuning and switching information only | 0B | 1 | |
| Basic tuning and switching information only | 0A | 0 | |

FIG. 11

| | | | | | | | | |
|---|---|---|---|---|---|---|---|---|
| | 0 | 0 | 0 | 0 | 0 | 0 | 1 | 0 |
| | 0 | | | 0 | 1 | 0 | 0 | 0 |
| PS0 | R | o | c | k | - | - | - | - |
| PS1 | K | i | c | k | s | y | - | - |
| PS2 | | | | | | | | |
| PS3 | | | | | | | | |
| PS4 | | | | | | | | |
| PS5 | | | | | | | | |
| PS6 | | | | | | | | |
| PS7 | | | | | | | | |

1802

| | | | | | | | | |
|---|---|---|---|---|---|---|---|---|
| | 0 | 0 | 0 | 0 | 0 | 1 | 0 | 0 |
| | 0 | | | 0 | 1 | 0 | 0 | 0 |
| PS0 | R | o | c | k | - | - | - | - |
| PS1 | K | i | c | k | s | y | - | - |
| PS2 | - | - | 9 | 6 | . | 5 | - | - |
| PS3 | | | | | | | | |
| PS4 | | | | | | | | |
| PS5 | | | | | | | | |
| PS6 | | | | | | | | |
| PS7 | | | | | | | | |

1100

| RDS_CONFIG | | ADVCTRL | | | | | RDS_CONFIG (XFR Mode) | | | | | | | | |
|---|---|---|---|---|---|---|---|---|---|---|---|---|---|---|---|
| Flush Timer | DEPTH | RDSBLOCKE | RDSBADBLOCK | RDSPSEN | RDSRTEN | RDSFILTER | MCHB_1 | MCHB_0 | MSKB_1 | MSKB_0 | GFILT_3 | GFILT_2 | GFILT_1 | GFILT_0 | Configuration |
| 1 | 1 | 1 | 1 | 0 | 0 | 0 | 0xFF | 0xFF | 0xFF | 0xFF | 0x00 | 0x00 | 0x00 | 0x00 | Host wants every RDS group, even Block-E and uncorrectable blocks. |
| X | X | 0 | 0 | 0 | 0 | 0 | 0x00 | 0x00 | 0x07 | 0xFF | 0xFF | 0xFF | 0xFF | 0xFF | Host wants only Group Type 0A. This method uses Block-B match. |
| 1 | 1 | 0 | 0 | 0 | 0 | 0 | 0xFF | 0xFF | 0xFF | 0xFF | 0xFF | 0xFF | 0xFF | 0xCC | Host wants Group 0a/b and 2A/B. This method uses the Group Filter. |
| 5 | 1 | 0 | 0 | 0 | 0 | 1 | 0x28 | 0x00 | 0x07 | 0xFF | 0xFF | 0xFF | 0xFF | 0xDF | Host wants Group 2B and Group 8A when changes |
| 5 | 1 | 0 | 0 | 0 | 1 | 0 | 0xFF | 0xFF | 0xFF | 0xFF | 0xFF | 0xFF | 0xFF | 0xFE | Host wants only Group 0A and Radio Text events. |
| 5 | 21 | 0 | 0 | 1 | 1 | 1 | 0xFF | 0xFF | 0xFF | 0xFF | 0x00 | 0x00 | 0x00 | 0x33 | PS and RT events. Al other groups upon change. |
| X | X | 0 | 0 | 1 | 1 | 0 | 0xFF | 0xFF | 0xFF | 0xFF | 0xFF | 0xFF | 0xFF | 0xFF | Handset Minimal Processing – Only interested in PS and RT events. |

FIG. 26

RADIO DATA SYSTEM (RDS) DATA PROCESSING METHODS AND APPARATUS

BACKGROUND

1. Field

The subject technology relates generally to radio transmissions or reception, and more specifically to radio data system (RDS) data processing methods and apparatus.

2. Background

Broadcast radio data is typically used in FM radio stations, which transmit stereo-multiplex signals in the VHF frequency band. Broadcast radio data can be used by the FM radio stations to display information relating to their radio broadcast. An FM radio, which receives the broadcast radio data, can reproduce that data on a display. The raw broadcast radio data itself is passed to the host processor of the FM radio. The host processor then typically processes the raw broadcast radio data, so that the data can be reproduced on the display. In this regard, the host processor must typically handle numerous interrupts associated with the broadcast radio data, thus causing the host processor to use more power, memory and processing cycles. As such, there is a need in the art for a system and methodology to improve power and memory efficiency of the host processor.

SUMMARY

In one aspect of the disclosure, a host system for processing radio data system (RDS) data is provided. The host system includes a host processor. The host system further includes a data processor configured to receive the RDS data, configured to filter the RDS data to allow the host processor to receive a selected set of the RDS data, and configured to reduce the number of interrupts to the host processor.

In a further aspect of the disclosure, a data processor for processing radio data system (RDS) data is provided. The data processor includes a filter module configured to receive the RDS data, configured to filter the RDS data to allow a host processor to receive a selected set of the RDS data, and configured to reduce the number of interrupts to the host processor.

In yet a further aspect of the disclosure, a host system for processing radio data system (RDS) data is provided. The host system includes a host processor and a data processor. The data processor comprises means for receiving the RDS data, means for filtering the RDS data to allow the host processor to receive a selected set of the RDS data, and means for reducing the number of interrupts to the host processor.

In yet a further aspect of the disclosure, a method of processing radio data system (RDS) data utilizing a data processor is provided. The method includes receiving, by the data processor, the RDS data. The method further includes filtering, by the data processor, the RDS data to allow a host processor to receive a selected set of the RDS data. In addition, the method includes reducing, by the data processor, the number of interrupts to the host processor.

In yet a further aspect of the disclosure, a machine-readable medium encoded with instructions for processing radio data system (RDS) data within a data processor is provided. The instructions include code for receiving, by the data processor, the RDS data. The instructions further include code for filtering, by the data processor, the RDS data to allow a host processor to receive a selected set of the RDS data. In addition, the instructions include code for reducing, by the data processor, the number of interrupts to the host processor.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 11 is a conceptual block diagram illustrating an example of an RDS group filter.

FIG. 26 is a conceptual block diagram illustrating an example of a configuration for a transceiver core for performing various levels of RDS data processing.

DETAILED DESCRIPTION

The detailed description set forth below is intended as a description of various configurations of the subject technology and is not intended to represent the only configurations in which the subject technology may be practiced. The appended drawings and attached Appendix are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
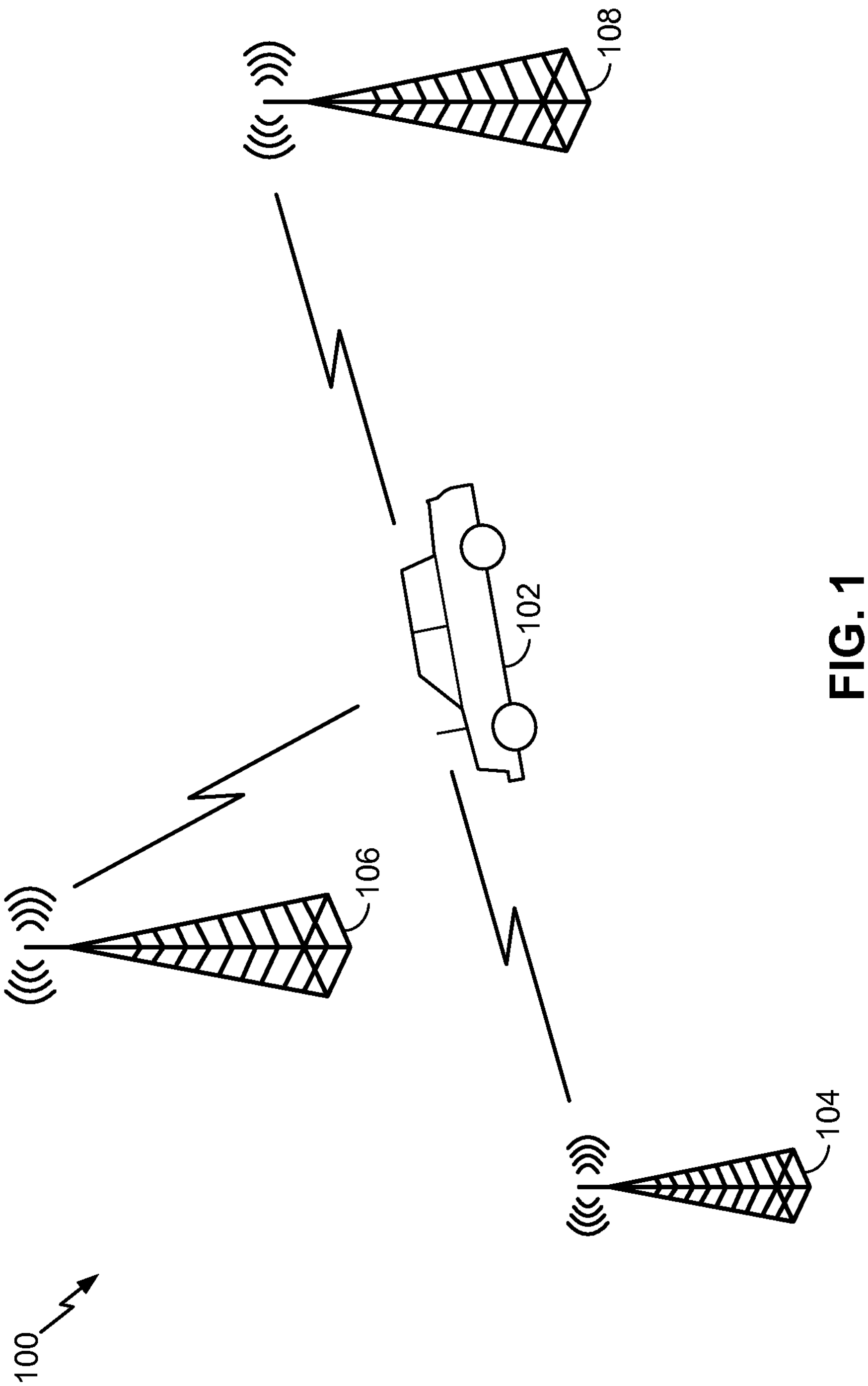
FIG. 1 is a diagram illustrating an example of a radio broadcast network in which a host system can be used.

FIG. 1 is a diagram illustrating an example of a radio broadcast network 100 in which a host system can be used. As seen in FIG. 1, radio broadcast network 100 includes multiple base stations 104, 106 and 108 for transmitting radio transmission broadcasts. The radio transmission broadcasts are typically transmitted as stereo-multiplex signals in the VHF frequency band. Radio data system (RDS) data can be broadcast by base stations 104, 106 and 108, to display information relating to the radio broadcast. For example, the station name, song title, and/or artist can be included in the RDS data. In addition or in the alternative, the RDS data can provide other services, such as showing messages on behalf of advertisers.

An exemplary utilization of the RDS data of this disclosure is for the European RDS standard, which is defined in the *European Committee for Electrotechnical Standardization, EN* 50067 specification. Another exemplary utilization of the RDS data of this disclosure is for the North American radio broadcast data system (RBDS) standard (also referred to as NRSC-4), which is largely based on the European RDS standard. As such, the RDS data of this disclosure is not limited to one or more of the above standards/examples. The RDS data can include, additionally or alternatively, other suitable information related to a radio transmission.

A host system at a receiving station 102 that receives the RDS data can reproduce that data on a display of the host system. In this example, receiving station 102 is depicted as a car. However, receiving station 102 should not be limited as such, and can also represent, for example, a person, another mobile entity/device, or a stationary entity/device associated with a host system. Furthermore, the host system can represent a computer, a laptop computer, a telephone, a mobile telephone, a personal digital assistant (PDA), an audio player, a game console, a camera, a camcorder, an audio device, a video device, a multimedia device, a component(s) of any of the foregoing (such as a printed circuit board(s), an integrated circuit(s), and/or a circuit component(s)), or any other device capable of supporting RDS. A host system can be stationary or mobile, and it can be a digital device.

Figure 2:
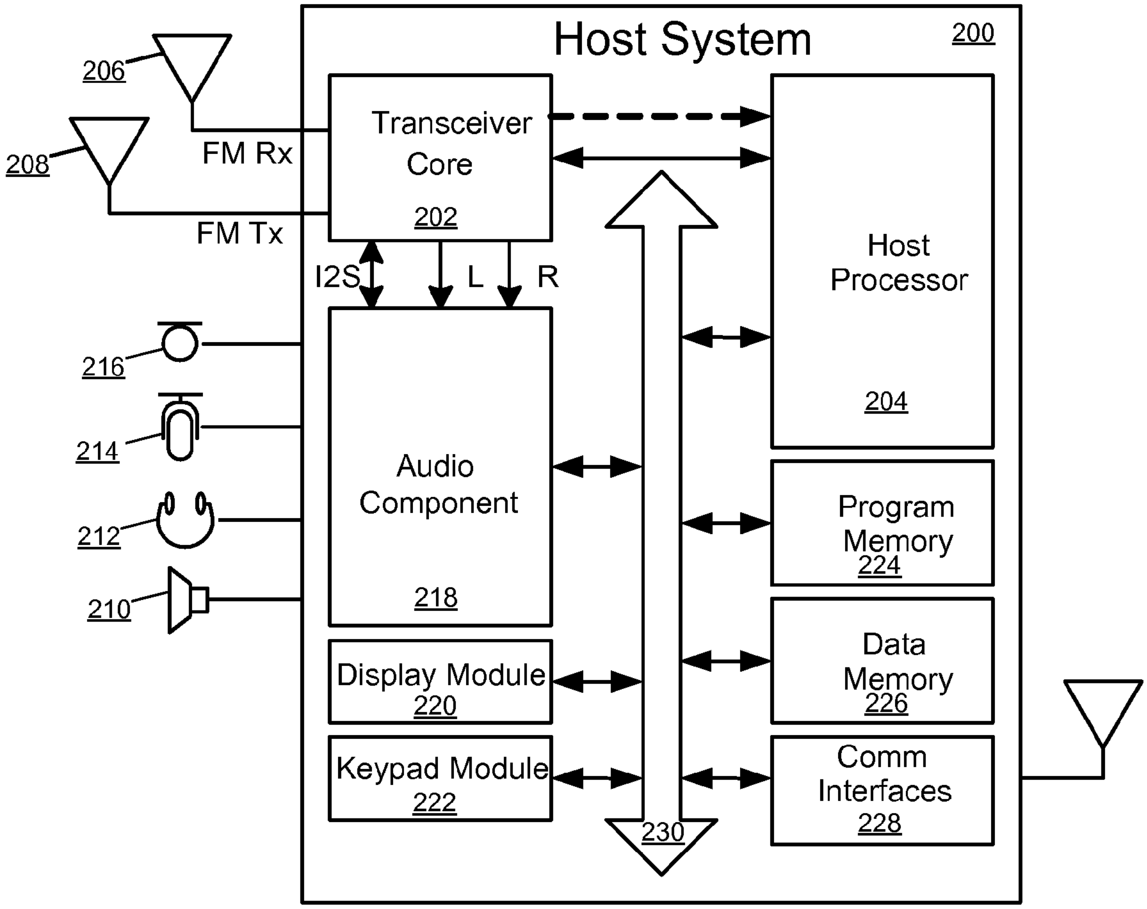
FIG. 2 is a conceptual block diagram illustrating an example of a hardware configuration for a host system.

FIG. 2 is a conceptual block diagram illustrating an example of a hardware configuration for a host system. Host system 200 includes transceiver core 202, which interfaces with host processor 204. Host processor 204 may correspond with a primary processor for host system 200.

Transceiver core 202 can send/receive Inter-IC Sound (I2s) information with audio component 218, and can send left and right audio data output to audio component 218. Transceiver core 202 can also receive FM radio information, which may include RDS data, through antenna 206. In addition, transceiver core 202 can transmit FM radio information through antenna 208.

In this regard, RDS data received by transceiver core 202 through antenna 206 can be processed by transceiver core 202, so as to reduce the number of interrupts sent to host processor 204. In one aspect of the disclosure, antenna 208, which is used for transmission of data, is not necessary for interaction between transceiver core 202 and host processor 204 or for reduction of interrupts.

Host system 200 may also include a display module 220 for displaying, among other things, RDS data received through antenna 206. Host system may also include keypad module 222 for user input, as well as program memory 224, data memory 226 and communication interfaces 228. Communication between audio module 218, display module 220, keypad module 222, host processor 204, program memory 224, data memory 226 and communication interfaces 228 may be possible via a bus 230.

In addition, host system 200 can include various connections for input/output with external devices. These connections include, for example, speaker output connection 210, headphone output connection 212, microphone input connection 214 and stereo input connection 216.

Figure 3:
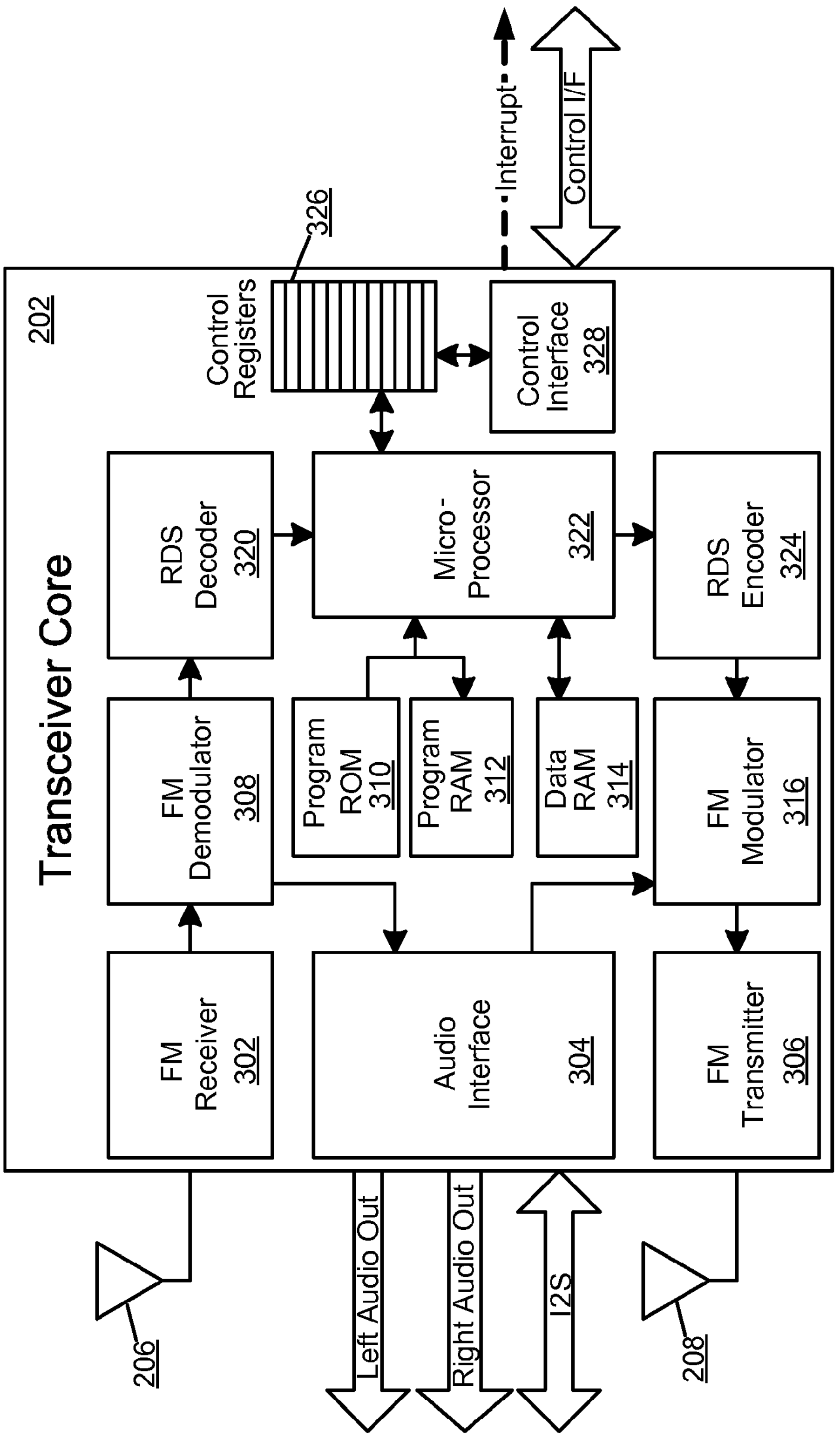
FIG. 3 is a conceptual block diagram illustrating an example of a hardware configuration for transceiver core of FIG. 2.

FIG. 3 is a conceptual block diagram illustrating an example of a hardware configuration for transceiver core 202 of FIG. 2. As noted above, transceiver core 202 can receive FM radio information, including RDS data, through antenna 206 and can transmit FM radio information through antenna 208. Transceiver core 202 can also send/receive Inter-IC Sound (I2s) data, and can send left and right audio output via audio interface 304 to other parts of host system 200.

Transceiver core 202 may include FM receiver 302 for receiving a FM radio signal, which may include RDS data. FM demodulator 308 can be used to demodulate the FM radio signal, and RDS decoder 320 can be used to decode encoded RDS data within the FM radio signal.

Transceiver core 202 may also include RDS encoder 324 for encoding RDS data of an FM radio signal, FM modulator 316 for modulating the FM radio signal, and FM transmitter 306 for transmitting the FM radio signal via antenna 208. As noted above, according to one aspect of the disclosure, transmission of an FM radio signal from transceiver core 202 is not necessary for interaction between transceiver core 202 and host processor 204 or for reduction of interrupts.

Transceiver core 202 also includes microprocessor 322 which, among other things, is capable of processing received RDS data. Microprocessor 322 can access program read only memory (ROM) 310, program random access memory (RAM) 312 and data RAM 314. Microprocessor 322 can also access control registers 326, each of which includes at least one bit. When handling RDS data, control registers 326 can provide at least an indication(s) whether host processor 204 should receive an interrupt(s) by, for example, setting a bit(s) in a corresponding status register(s).

In addition, control registers 326 can be seen to include parameters to filter RDS data and to reduce the number of interrupts to host processor 204. According to one aspect, these parameters are configurable (or controllable) by host processor 204, and depending on the parameter(s), transceiver core 202 can filter some or all of RDS data or not filter the RDS data. Furthermore, depending on the parameter(s), the number of interrupts to host processor 204 can be reduced or not reduced.

In addition, transceiver core 202 may include a control interface 328 which, among other things, is used in asserting host interrupts to host processor 204. In this regard, control interface 328 can access the control registers 326, since these registers are used for determining which interrupts are to be received by host processor 204.

Figure 4:
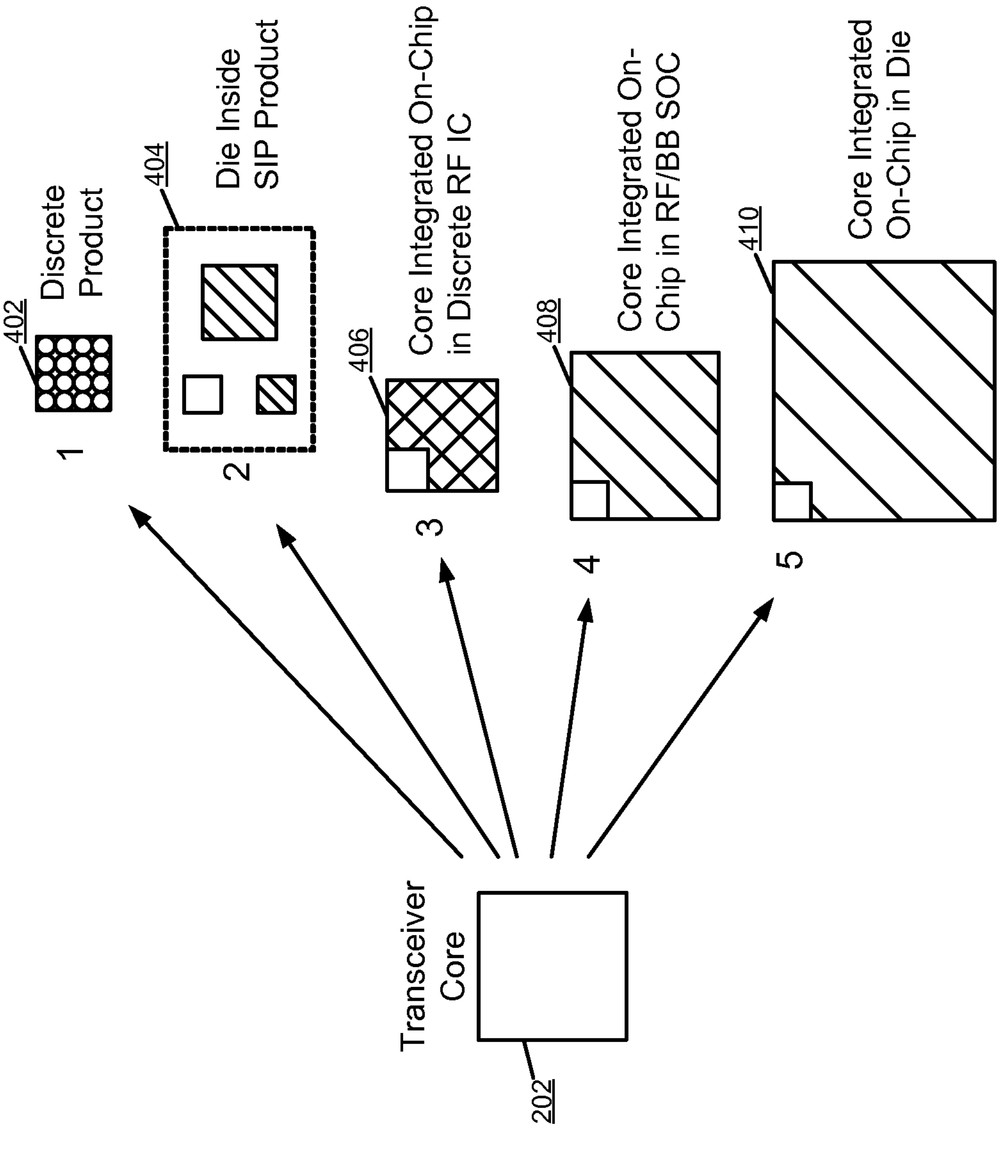
FIG. 4 is a conceptual block diagram illustrating examples of different implementations for a transceiver core.

FIG. 4 is a conceptual block diagram illustrating examples of different implementations of transceiver core 202. As shown in this diagram, transceiver core 202 can be integrated into various targets and platforms. These targets/platforms include, but are not limited to, a discrete product 402, a die inside a System in Package (SIP) product 404, a core integrated on-chip in discrete radio frequency integrated circuit (RF IC) 406, a core integrated on-chip in radio front end base band system-on-chip (RF/BB SOC) 408 and a core-integrated on-chip in die 410. As such, transceiver core 202 and host processor 204 can be implemented on a single chip or a single component, or can be implemented on separate chips or separate components.

Figure 5:
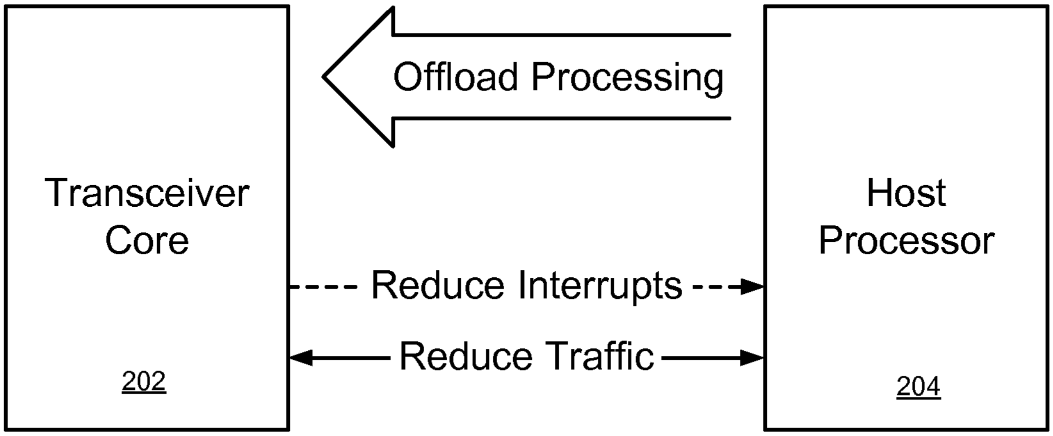
FIG. 5 is a conceptual block diagram illustrating an example of benefits provided by using a transceiver core with a host processor.

FIG. 5 is a conceptual block diagram illustrating an example of benefits provided by using a transceiver core with a host processor. As shown in FIG. 5, host processor 204 can offload processing to transceiver core 202. In addition, the number of interrupts asserted to host processor 204 can be reduced, since transceiver core 202 can, for example, filter the RDS data and/or include a buffer for the RDS data. In addition, the amount of traffic to host processor 204 can be reduced. As such, power and memory efficiency of the host processor is seen to be improved.

Figure 6:
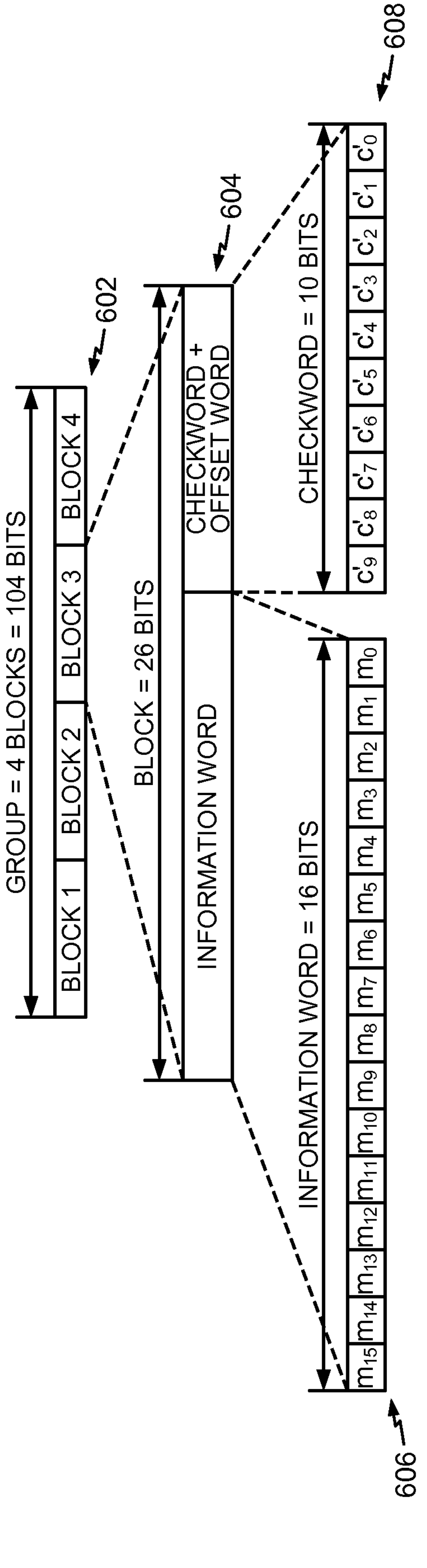
FIG. 6 is a conceptual block diagram illustrating an example of the structure of the baseband coding of the RDS standard.

FIG. 6 is a conceptual block diagram illustrating an example of the structure of the baseband coding of RDS data. RDS data may include one or more RDS groups. Each RDS group may have 104 bits. Each RDS group 602 may include 4 blocks, each block 604 having 26 bits each. More particularly, each block 604 may include an information word 606 of 16 bits and a checkword 608 of 10 bits.

Figure 7:
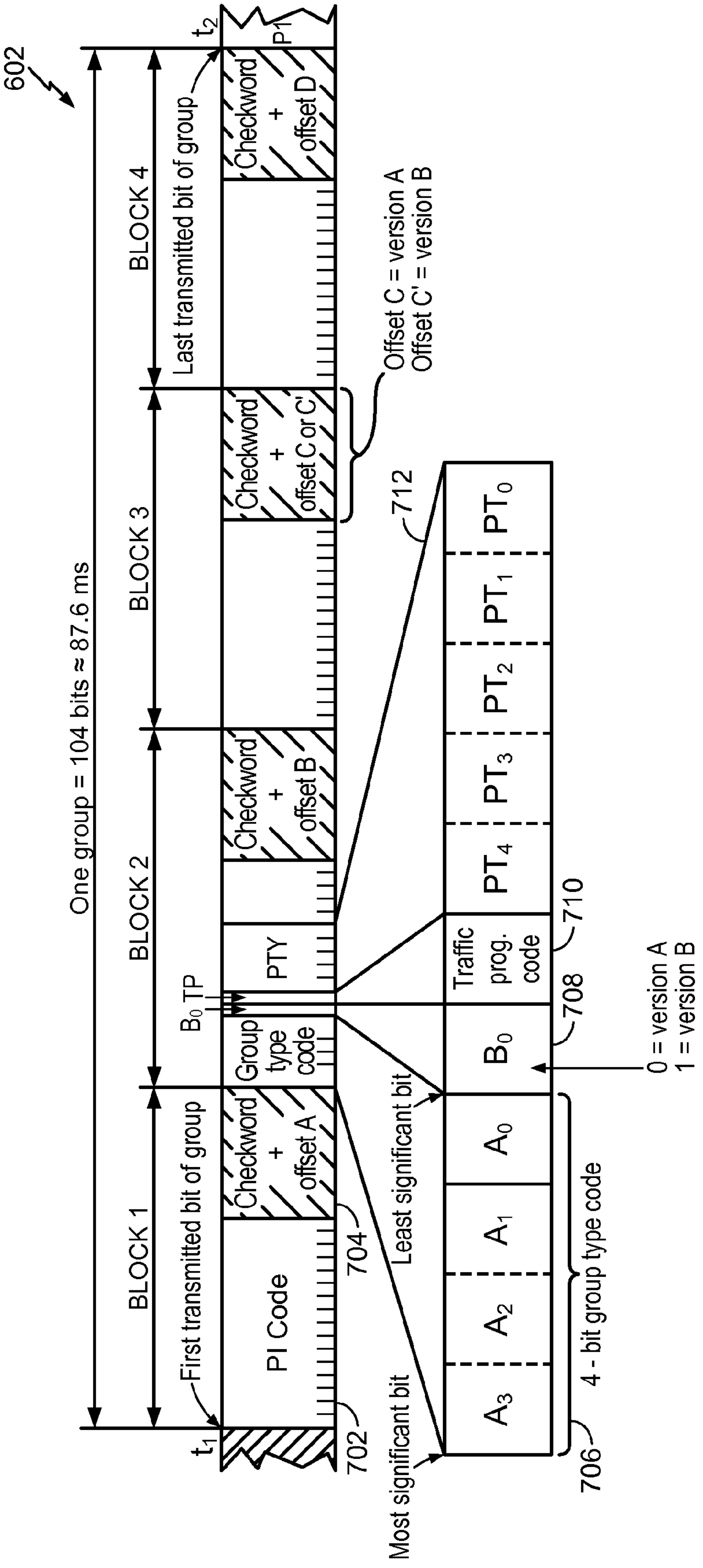
FIG. 7 is a conceptual block diagram illustrating an example of a message format and address structure for RDS data.

FIG. 7 is a conceptual block diagram illustrating an example of a message format and address structure for RDS data. Block 1 of every RDS group may include a program identification (PI) code 702. Block 2 may include a 4-bit group type code 706, which generally specifies how the information within the RDS group is to be applied. Groups are typically referred to as type 0 to 15 according to binary weighting $A_3=8$, $A_2=4$, $A_1=2$, $A_0=1$. Further, for each type 0 to 15, a version A and a version B may be available. This version may be specified by a bit 708 (i.e., $B_0$) of block 2, and a mixture of version A and version B groups may be transmitted on a particular FM radio station. In this regard, if $B_0=0$, the PI code is inserted in block 1 only (version A) and if $B_0=1$, the PI code is inserted in block 1 and block 3 for all group types (version B). Block 2 also may include 1 bit for a traffic code 710, and 4 bits for a program type (PTY) code 712.

Figure 8:
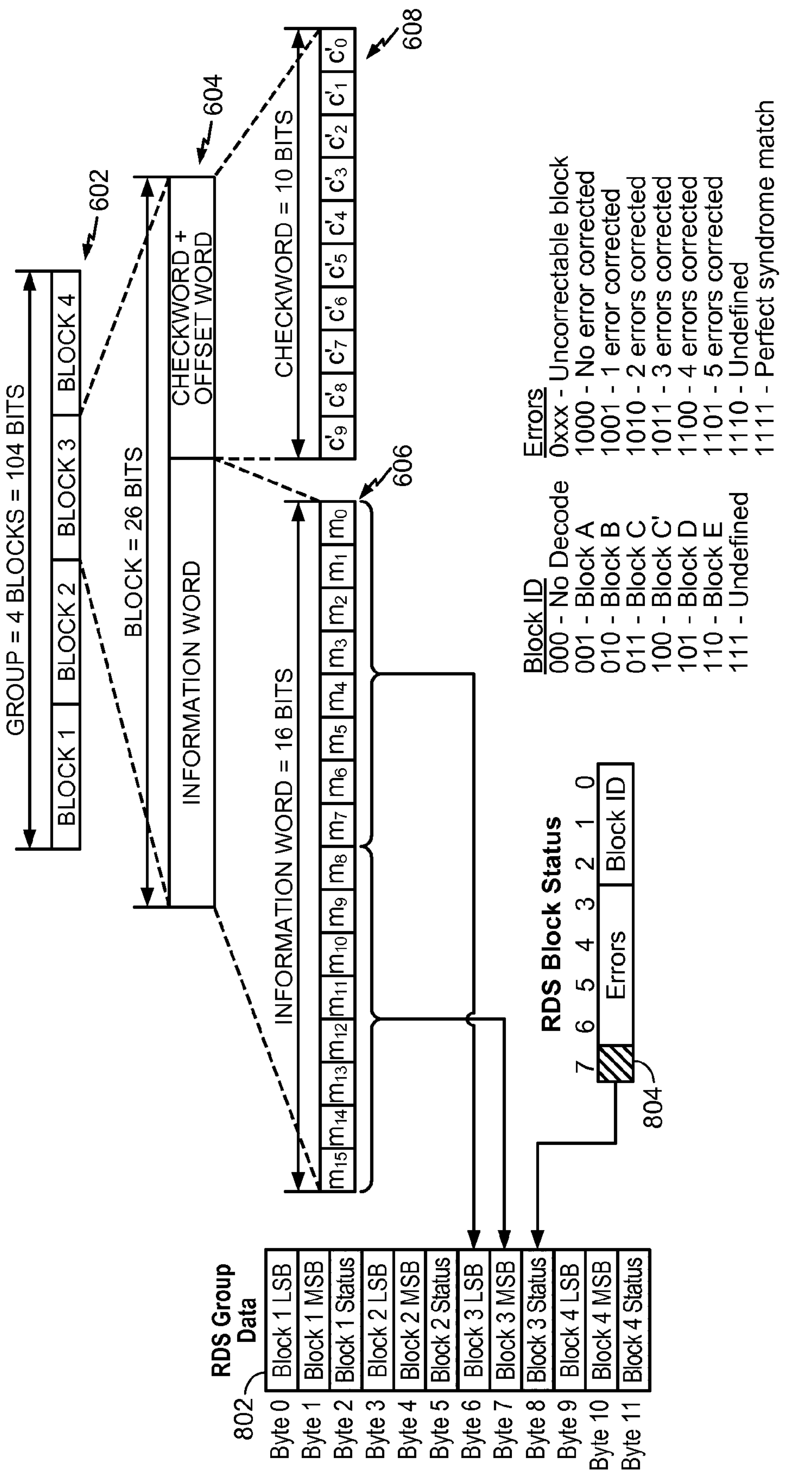
FIG. 8 is a conceptual block diagram illustrating an example of an RDS group data structure.

FIG. 8 is a conceptual block diagram illustrating an example of an RDS group data structure. Each RDS group data structure 802 may correspond to an RDS group 602 including plural blocks 604. For each of the plural blocks 604, the RDS group data structure may store the least significant bits (LSB) and most significant bits (MSB) of the information word 606 as separate bytes. In addition, RDS group data structure 802 may include a block status byte 804 for each block, where the block status byte 804 may indicates a block identification (ID) and whether there are uncorrectable errors in the block.

The RDS group data structure 802 represents an exemplary data structure which can be processed by transceiver core 202. In this regard, transceiver core 202 includes a core digital component and a core firmware component, which are described in more detail below with reference to FIG. 9. The core digital component correlates each block 604 of an RDS group 602 with the associated checkword 608, and generates a block status byte 804 indicating the block ID and whether there are any uncorrectable errors in the block 604. The 16 bits of the information word 606 are also placed in the RDS group data structure 802. The core firmware typically receives RDS group data 802 from the core digital component approximately every 87.6 msec.

It should be understood that the structures of RDS data described above are exemplary, and the subject technology is not limited to these exemplary structures of RDS data and applies to other structures of data.

Figure 9:
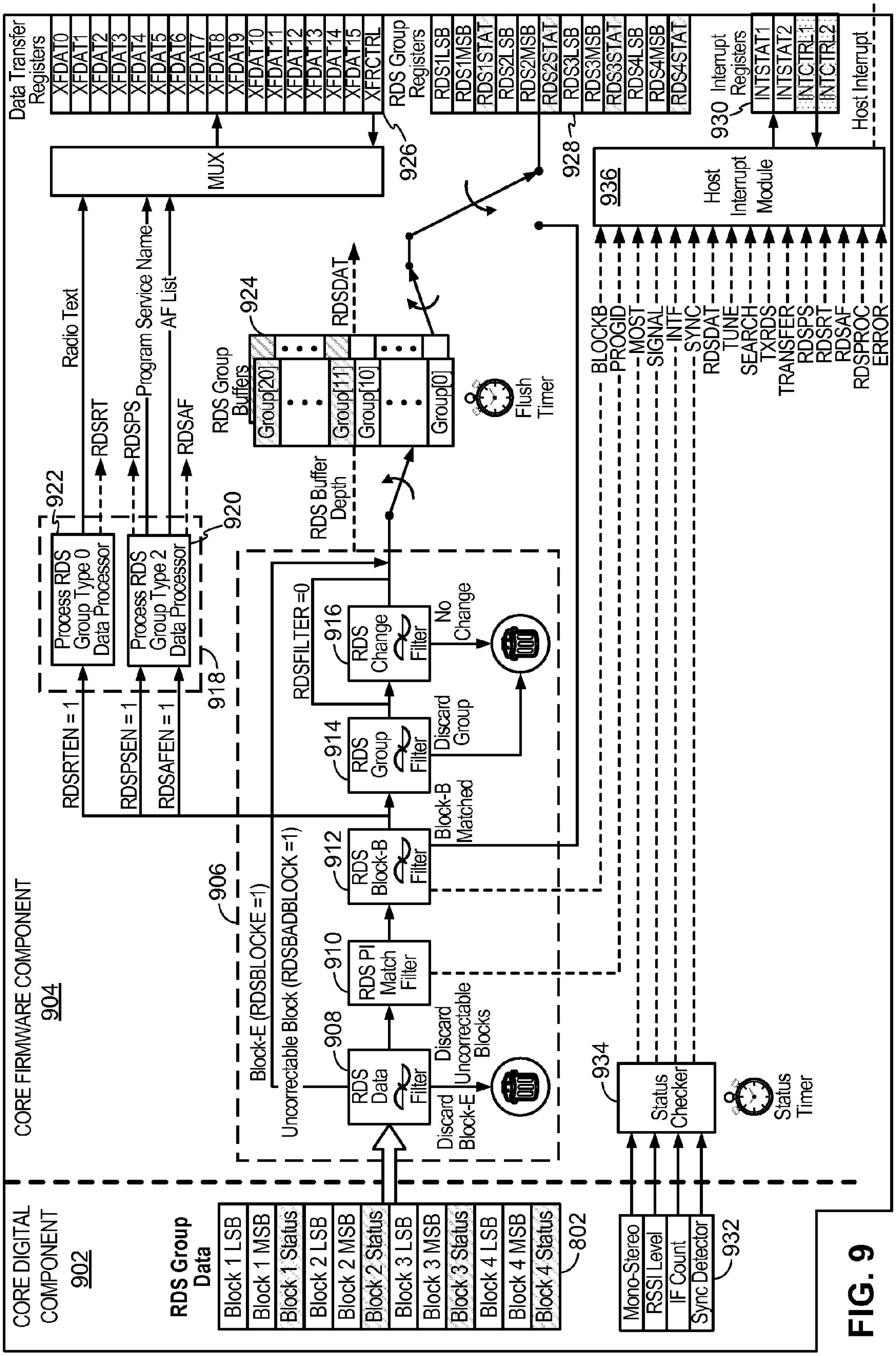
FIG. 9 is a conceptual block diagram illustrating a core digital component and core firmware component of a transceiver core.

FIG. 9 is a conceptual block diagram illustrating a core digital component and core firmware component of transceiver core 202. As noted above, core firmware component 904 can receive RDS group data 802 from core digital component 902 approximately every 87.6 msec. The filtering and data processing performed by core firmware component 904 can potentially reduce the number of host interrupts and improve host processor utilization.

Core firmware component 904 may include host interrupt module 936 and interrupt registers 930 for asserting interrupts to host processor 204. Interrupt registers 930 may be controllable by host processor 204. Core firmware component 904 may also include filter module 906, which may include RDS data filter 908, RDS program identification (PI) match filter 910, RDS Block-B filter 912, RDS group filter 914 and RDS change filter 916. In addition, core firmware component 904 may include group processing component 918. Core firmware component 904 may also include RDS group buffers 924, which may be utilized to reduce the number of interrupts to host processor 204. The filtering of RDS data, processing of group types 0 and 2, and use of RDS group buffers 924 will be described later in more detail. Core firmware component 904 may also include data transfer registers 926 and RDS group registers 928, each of which may be controllable by host processor 204.

Core digital component 902 may provide data 932 including mono-stereo, RSSI level, interference (IF) count and sync detector information to core firmware component 904. This data 932 is receivable by status checker 934 of core firmware component 904. Status checker 934 processes data 932, and the processed data may result in an interrupt being asserted to host processor 204 via host interrupt module 936.

Filter module 906, which may include various filter components, will now be described in greater detail. RDS data filter 908 of filter module 906 can filter out an RDS group having either an uncorrectable error or a Block-E group type. Host processor 204 can enable transceiver core 202 so that RDS data filter 908 discards erroneous or unwanted RDS groups from being processed further. As previously noted, RDS data filter 908 may receive a group of RDS blocks approximately every 87.6 msec.

If the block ID (which is correlated into the block status for a particular block) within an RDS group is "Block-E" and the RDSBLOCKE is not set in an ADVCTRL register of transceiver core 202, the RDS data group is discarded. If, however, the RDSBLOCKE is set in the ADVCTRL register, the data group is placed in RDS group buffer 924, thus bypassing any further processing. In this regard, block-E groups may be used for paging systems in the United States. They may have the same modulation and data structure as RDS data but may employ a different data protocol.

If block status 804 (see FIG. 8) of an RDS group is marked as "Uncorrectable" or "Undefined" and the RDSBAD-BLOCK is not set in the ADVCTRL register, the RDS data group is discarded. Otherwise, the data group is placed directly into RDS Group buffer 924. All other data groups are forwarded on through filter module 906 for further processing.

The next filter within filter module 906 is RDS PI match filter 910. RDS PI match filter 910 may determine whether an RDS group has a program identification (ID) which matches a given pattern, so that an interrupt to host processor 204 can be asserted. Host processor 204 can enable transceiver core 202 to assert an interrupt whenever the program ID in block 1 and/or the bits in block 2 match a given pattern. RDS PI match filter 910 is enabled when host processor 204 writes the PICHK bytes in the RDS_CONFIG data transfer (XFR) mode of transceiver core 202. When RDS PI match filter 910 receives an RDS data group, it will compare the program identification (PI) in block 1 with the PICHK word provided by host processor 204. If the PI words match, then the PROGID interrupt status bit is set, and an interrupt is sent to host processor 204, if the PROGIDINT interrupt control bit of transceiver core 202 is enabled.

The PI can be a 4-digit Hex code unique for each station/program. As such, the capability of RDS PI match filter 910 could be used, for example, in cases where host processor 204 wants to know immediately whether a currently tuned channel is the program that it desires.

The next filter of filter module 906 is RDS Block-B filter 912. RDS Block-B filter 912 may determine whether an RDS group has a block 2 (i.e., Block-B) entry which matches a given Block-B parameter, so that an interrupt to host processor 204 can be asserted. RDS Block-B filter 912 can provide a quick route of specific data to host processor 204. If block 2 of the RDS data group matches the host processor defined Block-B filter parameters, then the group data is immediately made available for host processor 204 to process. No further processing of the RDS group data is performed in transceiver core 202.

Figure 10:
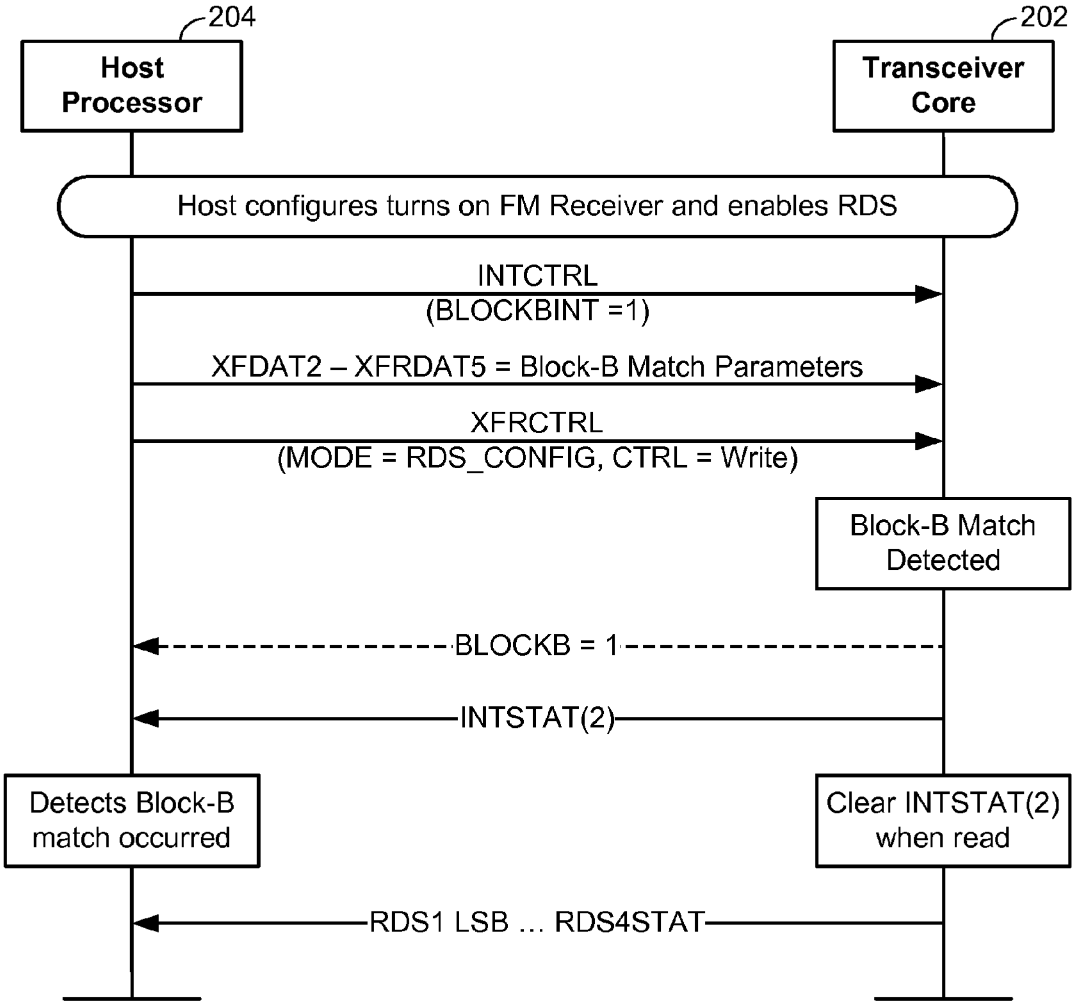
FIG. 10 is a sequence chart illustrating an example of a host receiving RDS Block-B data.

For example, FIG. 10 is an exemplary sequence chart illustrating one case of a host receiving RDS Block-B data. As can be seen in FIG. 10, host processor 204 can communicate with transceiver core 202. In this example, a Block-B match is detected in transceiver core 202, and host processor 204 becomes aware that a Block-B match has occurred.

Referring back to FIG. 9, the next filter of filter module 906 is RDS group filter 914. RDS group filter 914 can filter out an RDS group having a group type which is not within a given one or more group types. In other words, RDS group filter 914 can provide a means for host processor 204 to select which RDS group types to store into RDS group buffers 924, so that host processor 204 only has to process the data in which it is interested. Thus, host processor 204 can enable transceiver core 202 to only pass selected RDS group types.

In this regard, core firmware component 904 can be configured (e.g., by host processor 204) to filter out, if so desired, or not to filter out RDS group data for group type 0 or group type 2. FIG. 9 depicts that RDS group data 802 with either a group type 0 or group type 2 are processed by group processing component 918, if RDSRTEN, RDSPSEN, and/or RDSAFEN are set in the ADVCTRL register.

Still referring to RDS group filter 914, host processor 204 may filter out a specific group type (i.e., Core discards) by setting a bit in the following data transfer mode (RDS_CONFIG) registers in transceiver core 202:

| | |
|---|---|
| GFILT_0 | Block-B group type filter byte 0 (group type 0A-3B). |
| GFILT_1 | Block-B group type filter byte 1 (group type 4A-7B). |
| GFILT_2 | Block-B group type filter byte 2 (group type 8A-11B). |
| GFILT_3 | Block-B group type filter byte 3 (group type 12A-15B). |

Each bit in RDS group filter 914 represents a particular group type. FIG. 11 is a conceptual block diagram illustrating an example of RDS group filter 914. When transceiver core 202 is powered on or reset, RDS group filter 914 is cleared (all bits are set back to "0"). If a bit is set ("1") then that particular group type will not be forwarded.

Returning to FIG. 9, the next filter of filter module 906 is RDS change filter 916, which filters out an RDS group having RDS group data which has not changed. Host processor 204 can enable transceiver core 202 to pass the specified group types only if there are changes in RDS group data. RDS group data that passes through RDS group filter 914 may be applied to RDS change filter 916. RDS change filter 916 may be used to reduce the amount of repeat data for each particular group type. To enable RDS change filter 916, host processor 204 may set the RDSFILTER bit in the ADVCTRL register of transceiver core 202.

In accordance with one aspect of the disclosure, filter module 906 is capable of performing various types of filtering of RDS group data 802, so as to reduce the number of interrupts to host processor 204. As noted above, core firmware component 904 may also include group processing component 918, which will now be described in more detail.

Group processing component 918 may include RDS group type 0 data processor 922 and RDS group type 2 data processor 920. With reference to RDS group type 0 data processor 922, this processor may determine whether an RDS group has a group type 0 and whether there is a change in program service (PS) information for the RDS group, so as to assert an interrupt to host processor 204 when such a determination is positive.

Transceiver core 202 has the capability of processing RDS group type 0A and 0B data. This type of group data is typically considered to have the primary RDS features (e.g., program identification (PI), program service (PS), traffic program (TP), traffic announcement (TA), seek/scan program type (PTY) and alternative frequency (AF)) and is typically transmitted by FM broadcasters. For example, this type of group data provides FM receivers with tuning information such as the current program type (ex., "Soft Rock"), program service name (ex., "ROCK1053") and possible alternative frequencies that carry the same program.

Figure 12:
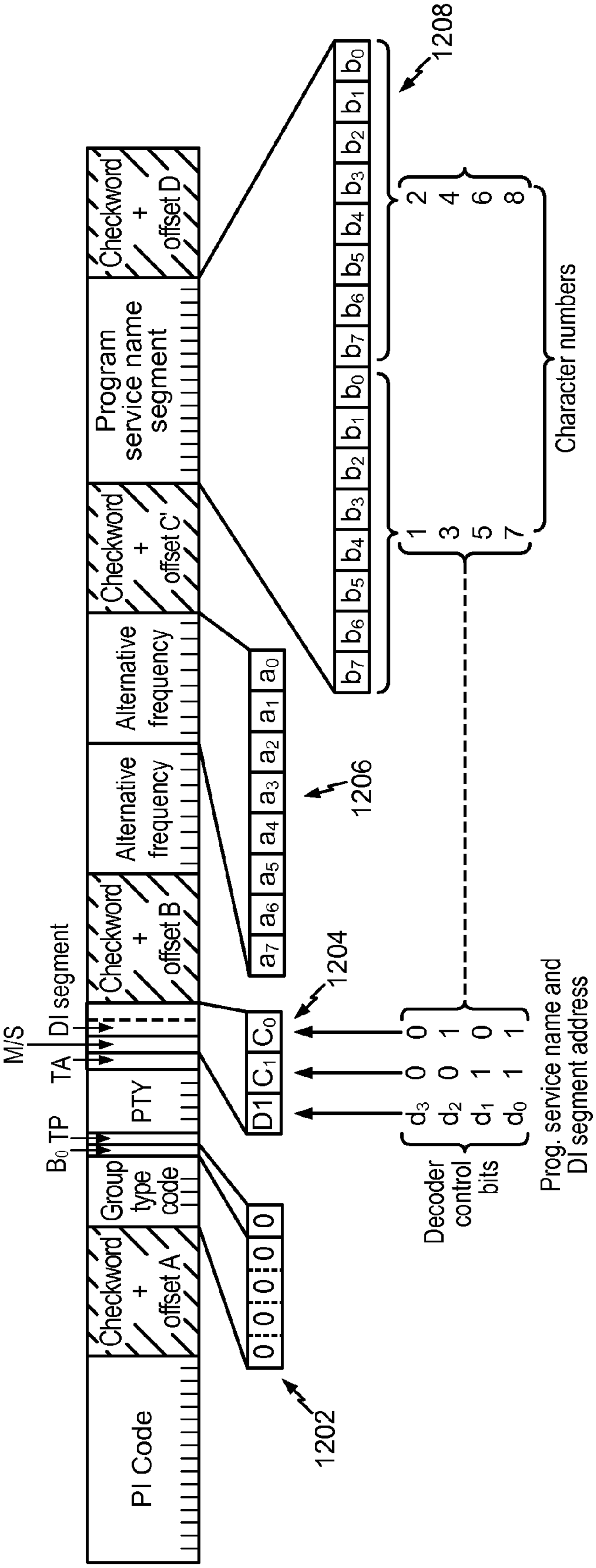
FIG. 12 is a conceptual block diagram illustrating an example of RDS basic tuning and switching information for a group type 0A.
Figure 13:
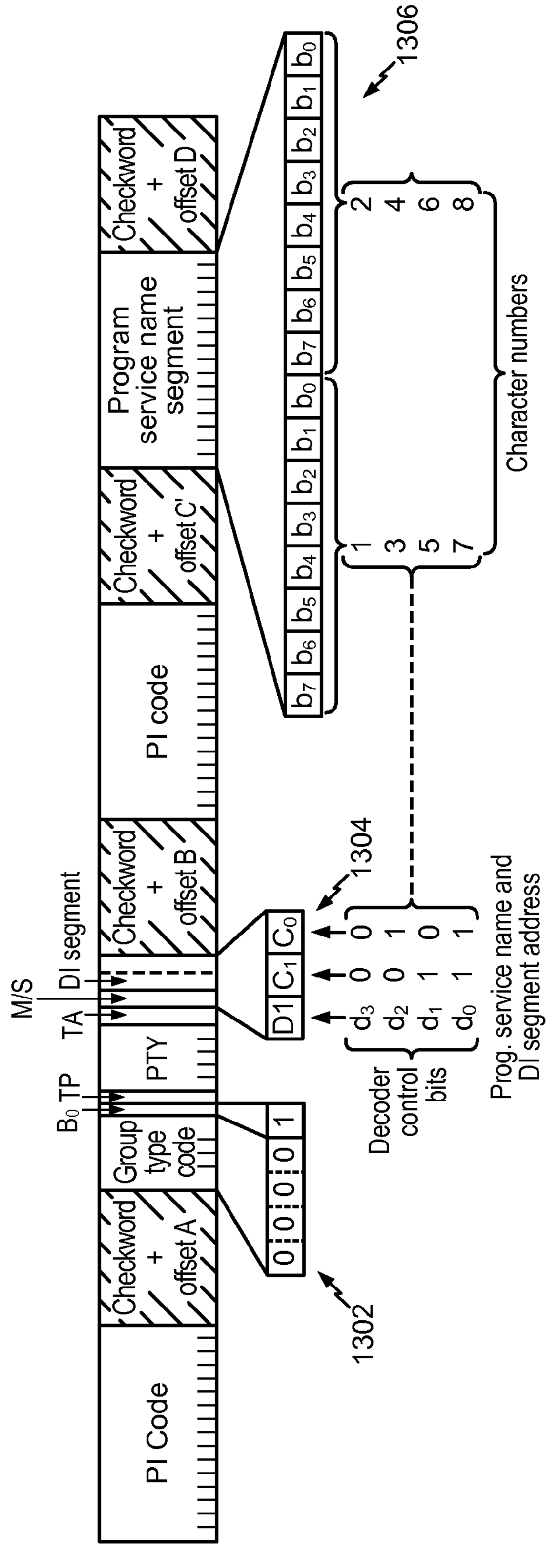
FIG. 13 is a conceptual block diagram illustrating an example of RDS basic tuning and switching information for a group type 0B.

In this regard, FIG. 12 is a conceptual block diagram illustrating an example of RDS basic tuning and switching information for RDS group type 0A. It shows, among other data, group type code 1202, program service name and DI segment address 1204, alternative frequency 1206, and program service name segment 1208. FIG. 13, on the other hand, is a conceptual block diagram illustrating an example of RDS basic tuning and switching information for group type 0B. It shows, among other data, group type code 1302, program service name and DI segment address 1304, and program service name segment 1306.

According to one aspect of the disclosure, transceiver core 202 can assemble and validate program service character strings, and only when the string changes, or is repeated once, transceiver core 202 alerts host processor 204. Host processor 204 may only have to output the indicated string(s) on its display. To enable the RDS program service name feature, host processor 204 can set the RDSPSEN bit in the ADVCTRL register of transceiver core 202.

With further reference to group type 0 processing, the program service (PS) table event may consist of an array of eight program service name strings (8 characters in length). This PS table may be seen to handle the United States radio broadcasters' usage of program service as a text-messaging feature similar to radio text.

Figure 14:
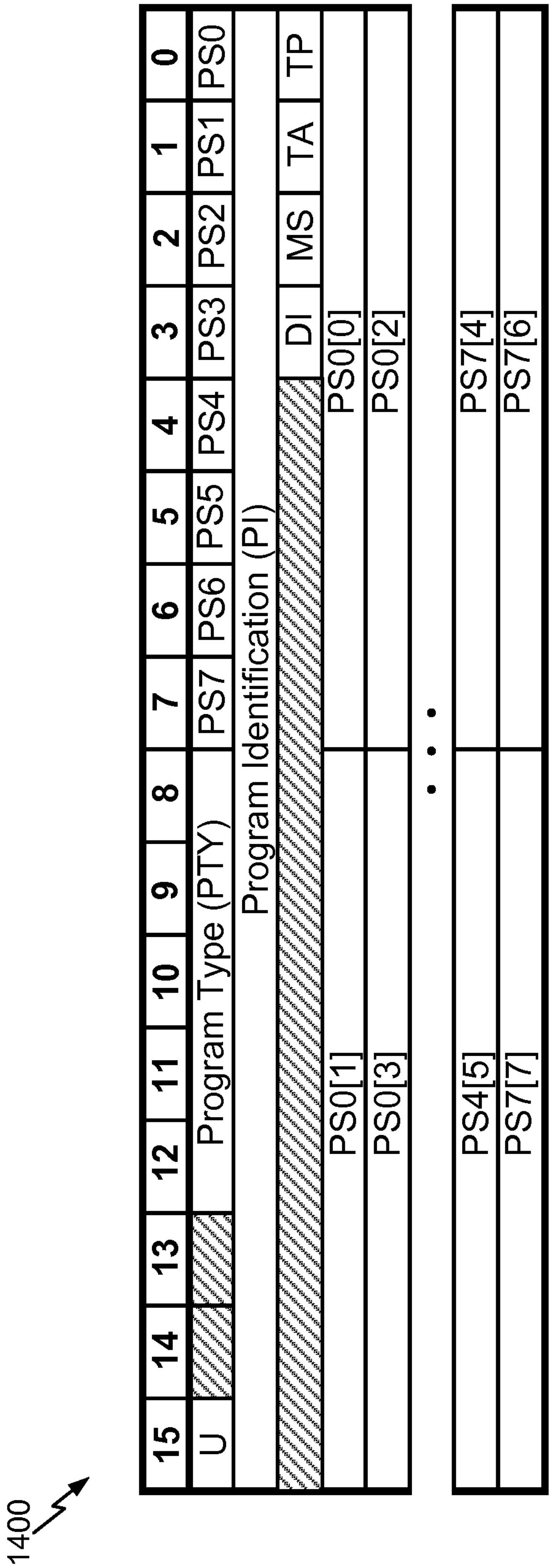
FIG. 14 is a conceptual block diagram illustrating an example of a format for a program service (PS) name table.

In this regard, FIG. 14 is a conceptual block diagram illustrating an example of a format for program service (PS) table 1400. The first byte of PS table 1400 may consist of bit flags (PS0-PS7) used to indicate which program service names in PS table 1400 are new or repeats. For example, if PS2-PS4 are set and the update bit ("U") is set, then host processor 204 only cycles through PS2-PS4 on its display.

The next five bits in PS table 1400 are the current program type (e.g., "Classic Rock"). The update flag ("U") indicates whether the indicated program service names are new ("0") or repeats ("1"). The 16-bits of program identification (PI) follow.

The next four bits in PS table 1400 are flags extracted from the group 0 packet, as follows:

| | |
|---|---|
| TP | traffic program |
| TA | traffic announcement |
| MS | music/speech switch code |
| DI | decoder identification control code |

The remaining bytes in PS table 1400 are the 8 PS names (8 characters each).

Figure 15:
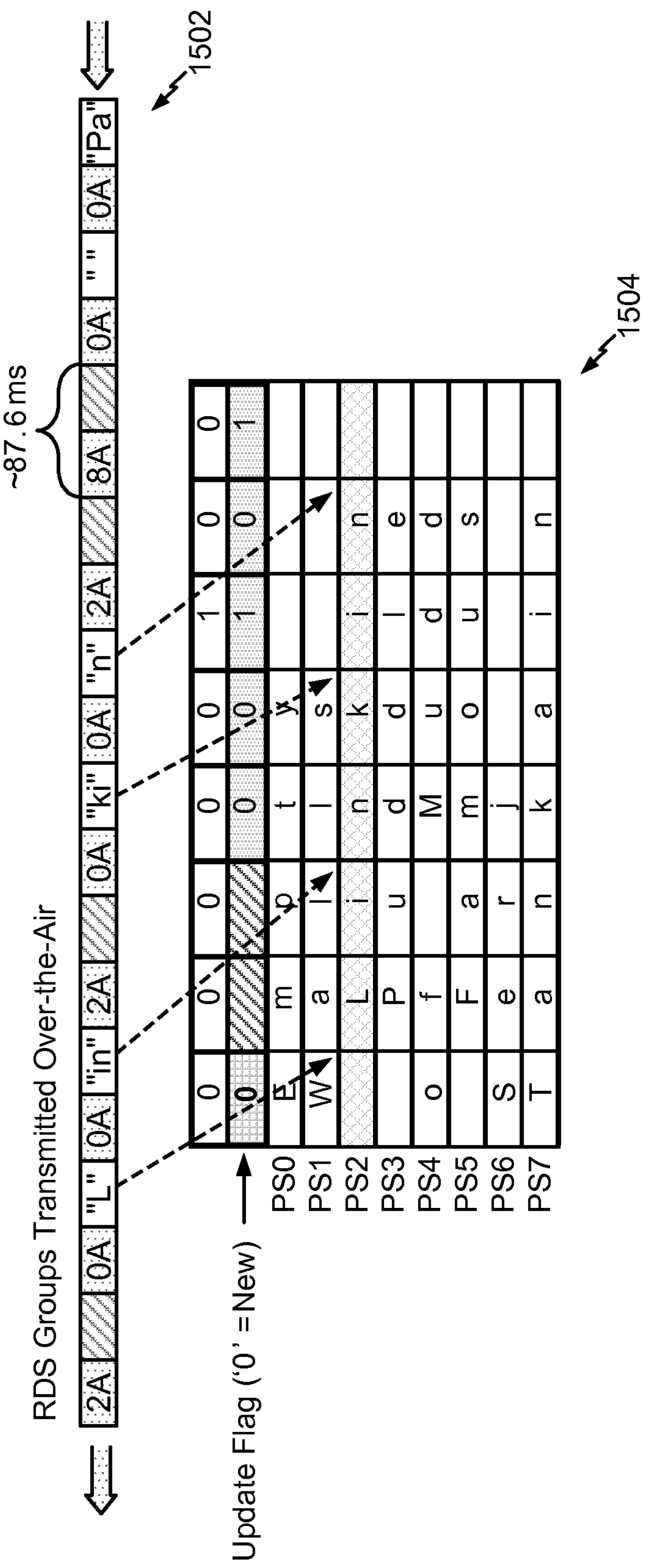
FIG. 15 is a conceptual block diagram illustrating an example of generating a PS name table.
Figure 16:
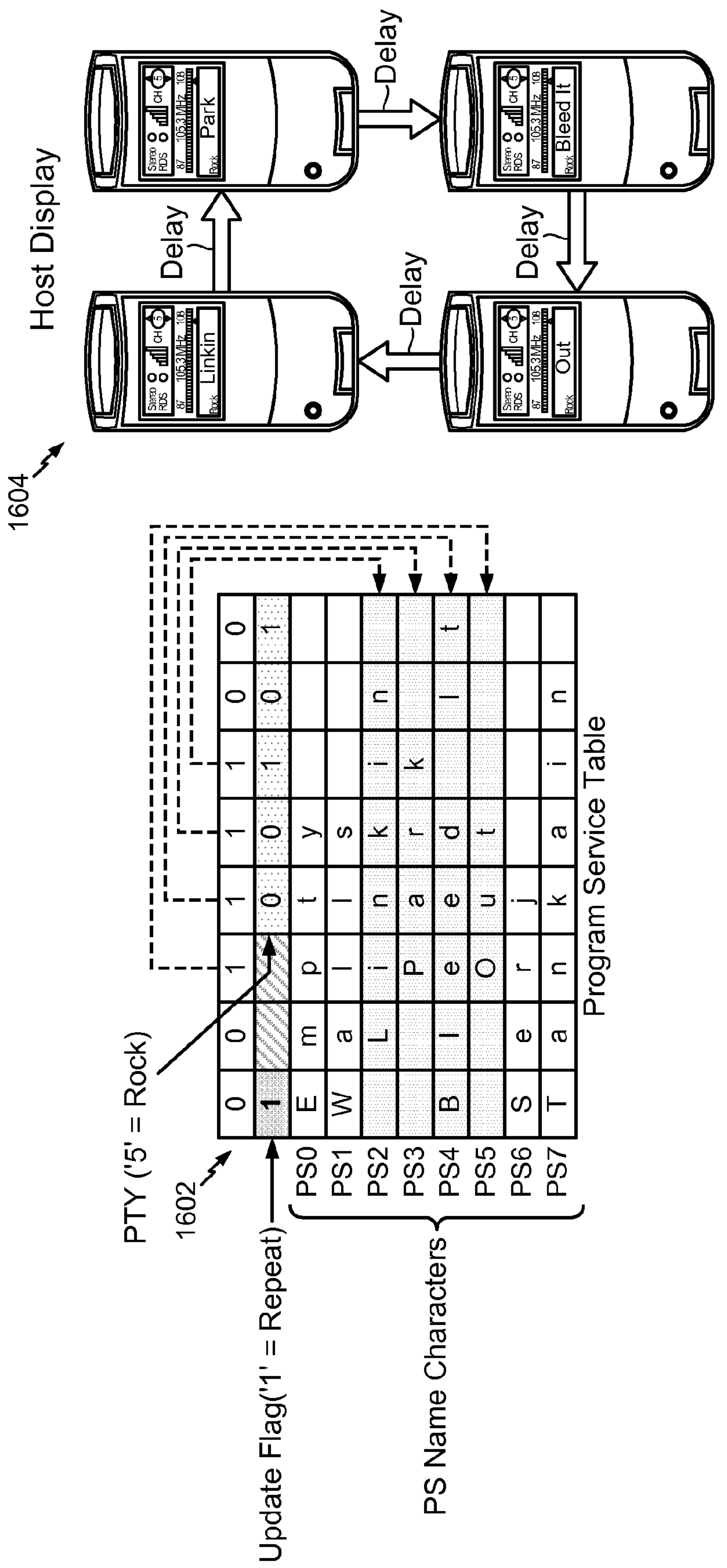
FIG. 16 is a conceptual diagram illustrating an example of PS name data and corresponding text displayed on a receiving unit.
Figure 17:
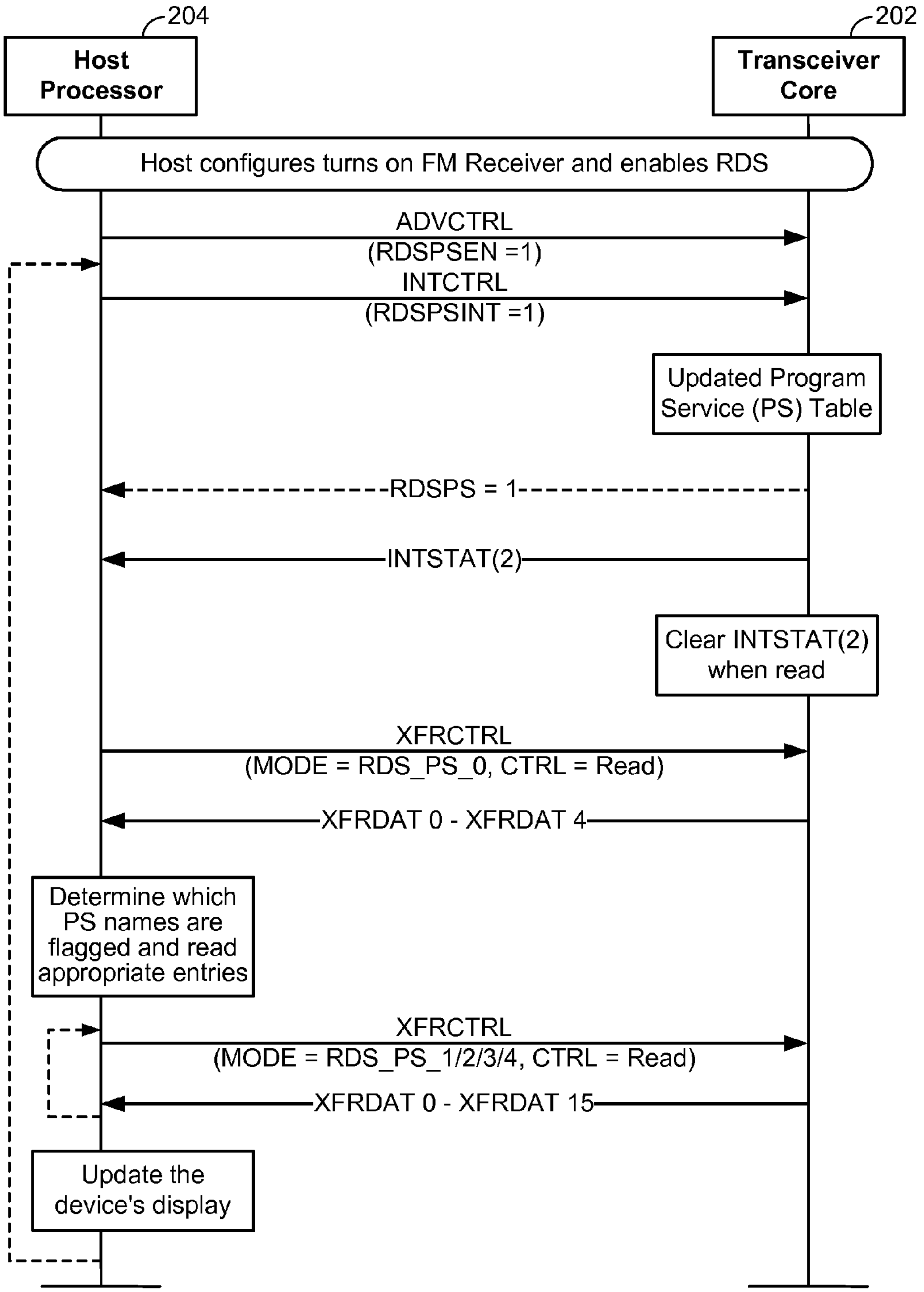
FIG. 17 is a sequence chart illustrating an example of processing RDS data with group type 0.

Examples of the usage of a PS table will now be described with reference to FIGS. 15 to 17. It should be noted that the PS tables in FIGS. 15 to 17 are in a different format than that of FIG. 14, to help demonstrate its usage. FIG. 15 is a conceptual block diagram illustrating an example of generating a PS name table 1504. In this example, the broadcaster is constantly transmitting the same sequences of group 0 packets 1502 indicating the artist and song title. Transceiver core 202 re-assembles and validates each PS name string and update PS table 1504 as needed.

FIG. 16 is a conceptual diagram illustrating an example of PS name data and corresponding text displayed on a host system 200. In FIG. 16, the content of the last PS table 1602 received by host processor 204 is shown. As such, host processor 204 should read the update flag, which indicates repeat, and cycle through the PS names as indicated in the PS bit flags for PS2 through PS5. These PS names can then be displayed on host display 1604.

Enabling the foregoing validation feature as well as filtering out group 0A/0B packets from RDS group buffers 924 (see FIG. 9) can greatly reduce the amount of traffic from transceiver core 202 to host processor 204. Only a few PS table events will occur during a song or a commercial break instead of many group 0 packets.

Still referring to group type 0 processing, FIG. 17 is a sequence chart illustrating an example of processing RDS data with group type 0. More particularly, FIG. 17 provides an example of how host processor 204 can enable the RDS group type 0 data processing feature and receive PS table data from transceiver core 202.

Host system 300 may provide for dynamic program service names for group type 0 data. The RBDS standard (North American equivalent of the European RDS standard) adopted less stringent requirements for PS usage. Broadcasters in the United States use the program service name to not only present call letters ("KPBS") and slogans ("Z-90"), but also use it to also transmit song title and artist information. Therefore, the PS may be continuously changing.

In this regard, FIGS. 18A to 18J are conceptual diagrams illustrating an example of dynamic PS name data and corresponding display text on host processor 204. In this example, an FM broadcaster uses the program service name to transmit "Soft," "Rock," "Kicksy," and "96.5" repeatedly during a commercial break. When a song starts to play, the broadcaster then transmits "Faith by," "George," and "Michael" continuously during the song. The broadcaster constantly repeats PS strings since it does not know when receivers are tuned into the station. Such repeated transmission can lead to numerous interrupts being sent to host processor 204. In each of FIGS. 18A to 18J, element 1802 corresponds with the PS name table and element 1804 corresponds with the host display.

Figure 18A:
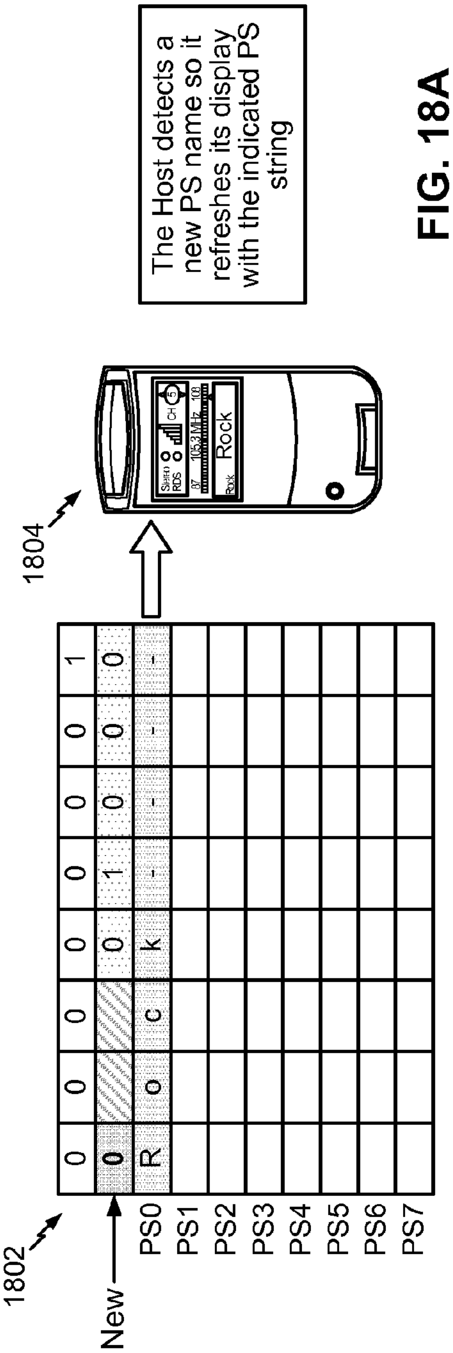
FIGS. 18A to 18J are conceptual diagrams illustrating an example of dynamic PS name data and corresponding display text on a host processor.

In FIG. 18A, which can be seen to correspond with a first event, transceiver core 202 is enabled during the broadcaster's commercial break and starts receiving RDS group type 0A segments 0-3 that create "Rock". This string is placed in PS table 1802, the corresponding PS bit is set, and the update flag is set to new ("0"). The current program type (PTY), program identification (PI), and other fields are also filled in.

In addition, the RDSPS interrupt status bit is set and if the RDSPSINT interrupt control bit is enabled, an interrupt is generated for host processor 204. Once host processor 204 reads PS table 1802, it detects that the PS name in the table is new and refresh its display 1804 with the indicated PS string.

Figure 18B:
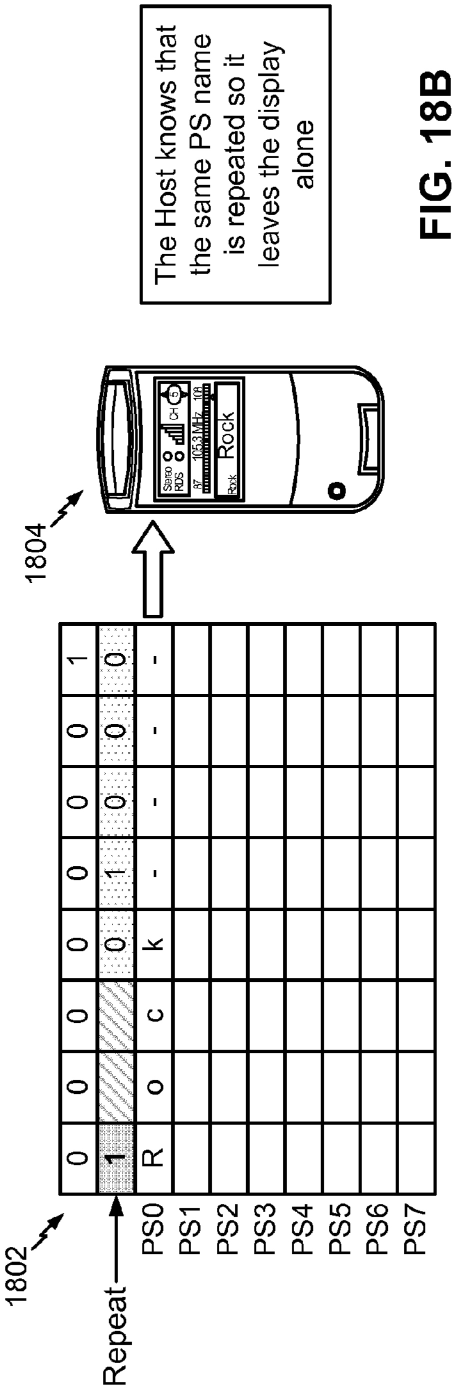

In FIG. 18B, which can be seen to correspond with a next event, the broadcaster transmits the same PS name again. Transceiver core 202 receives the next group 0A segments 0-3 which creates an 8-character string that matches an element already in PS table 1802. The repeated PS bit is set, and the update flag is set to repeat ("1"). An interrupt is generated for host processor 204, if enabled, and host processor 204 reads PS table 1802 and leaves its display 1804 with the repeated PS name.

Figure 18C:
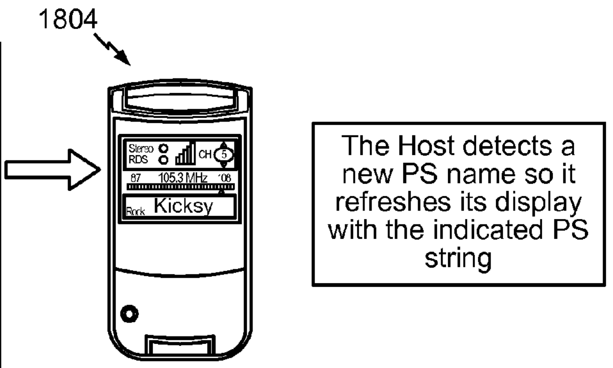
Figure 18D:
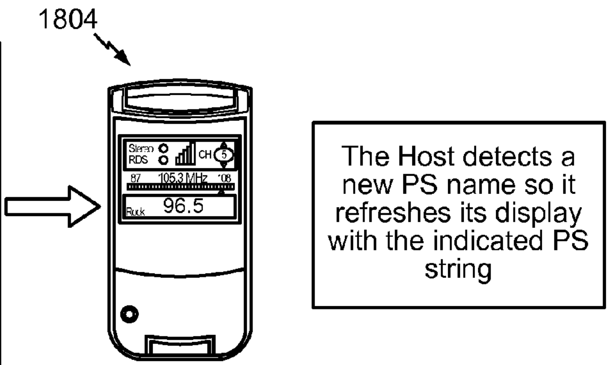

In FIG. 18C, the broadcaster transmits a new PS name. Transceiver core 202 receives group 0A segments 0-3 "Kicksy". Transceiver core 202 places the PS string in the next available slot in PS table 1802, sets the corresponding PS flag bit, and sets the update flag to new ("0").

In FIG. 18D, the broadcaster again transmits a new PS name. Transceiver core 202 receives group 0A segments 0-3 that create the string "96.5". Transceiver core 202 places the PS string in next available slot in PS table 1802, sets the corresponding PS flag bit, and sets the update flag to new ("0").

Figure 18E:
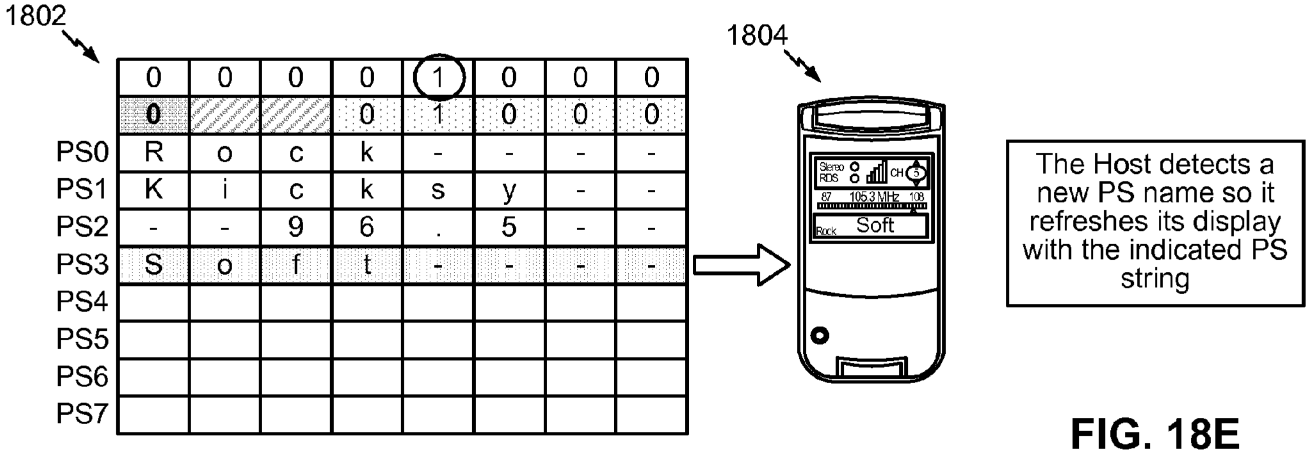
Figure 18F:
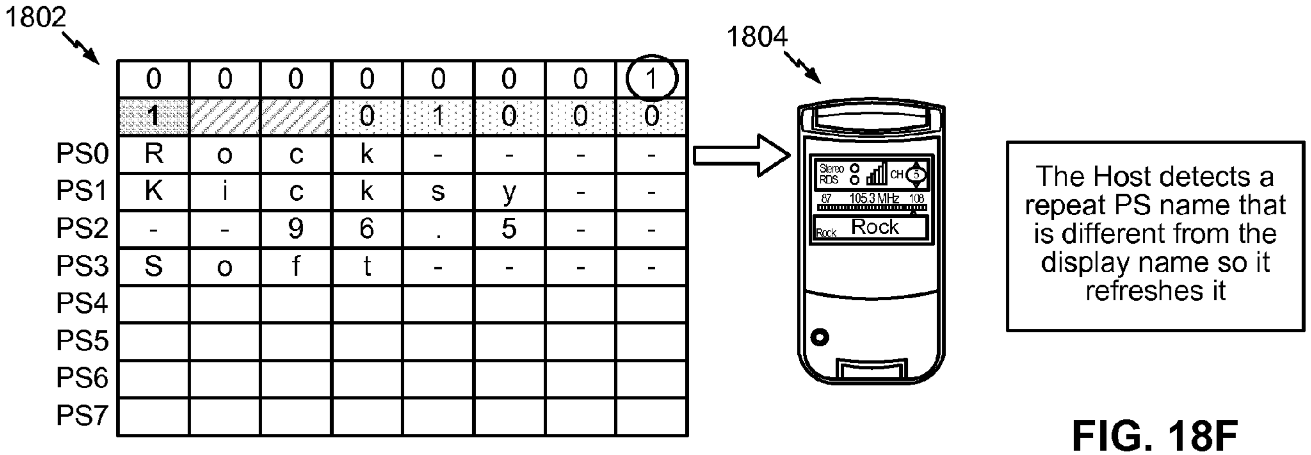

In FIG. 18E, the broadcaster transmits the PS name "Soft" and transceiver core 202 updates PS table 1802. In FIG. 18F, the broadcaster is repeating the four PS names throughout the commercial break. Transceiver core 202 receives "Rock" and so it sets the corresponding PS flag bit and the update flag to repeat ("1").

Figure 18G:
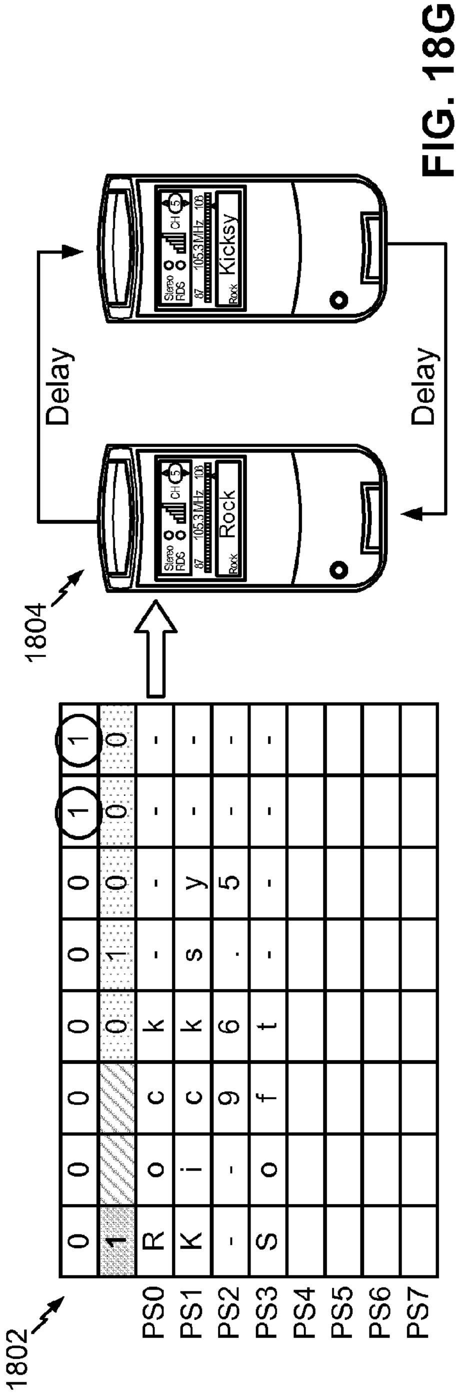

In FIG. 18G, transceiver core 202 receives "Kicksy" again and sets the PS flag bit and the update flag to repeat ("1"). Since there are now multiple program service names that are flagged as repeat, host processor 204 cycles through the PS names with a pre-defined delay (e.g., 2 seconds). If host processor 204 receives a PS table that indicates new PS names, it cancels the periodic display timer and displays the new PS name.

Figure 18H:
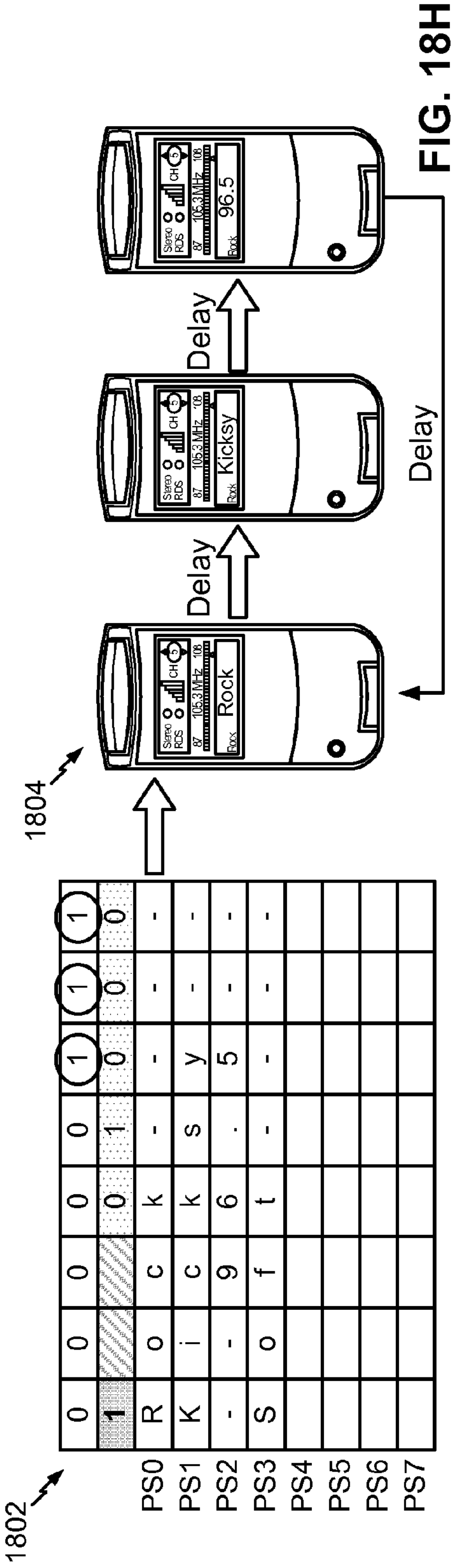

In FIG. 18H, transceiver core 202 receives the repeated string "96.5" and sets the corresponding PS bit and the update flag to repeat ("1").

Figure 18I:
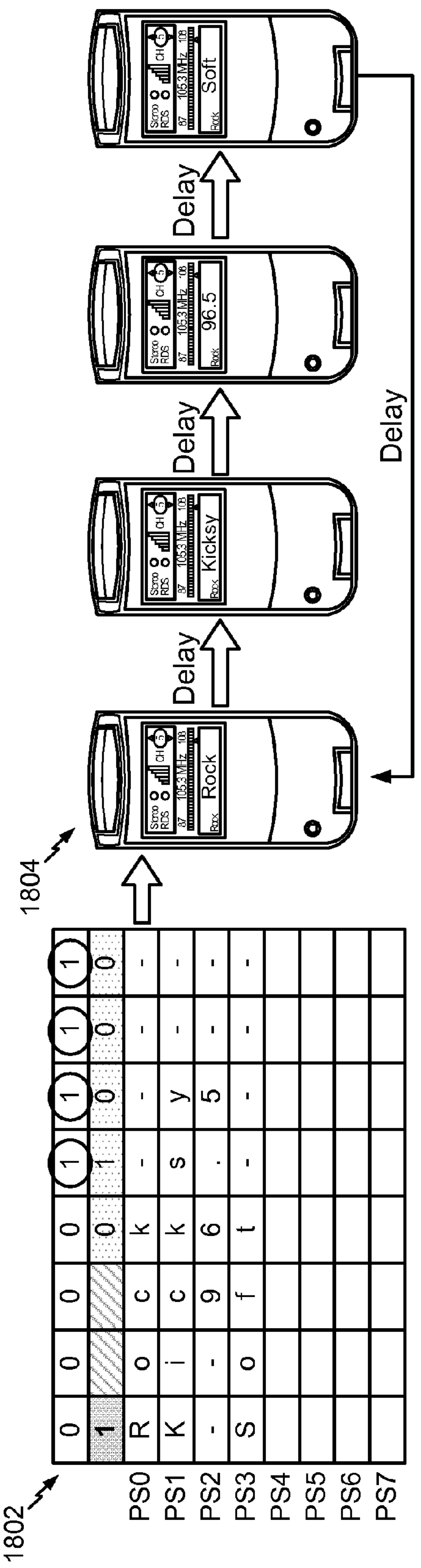

In FIG. 18I, transceiver core 202 receives the repeated string "Soft" and sets the corresponding PS bit and the update flag to repeat ("1"). At this point transceiver core 202 stops sending PS table events to host processor 204 since the PS names "Soft", "Rock", "Kicksy", and "96.5" repeat during the commercial break (which can last a few minutes). Host processor 204 uses the last PS table 1802 received to update its display 1804.

Figure 18J:
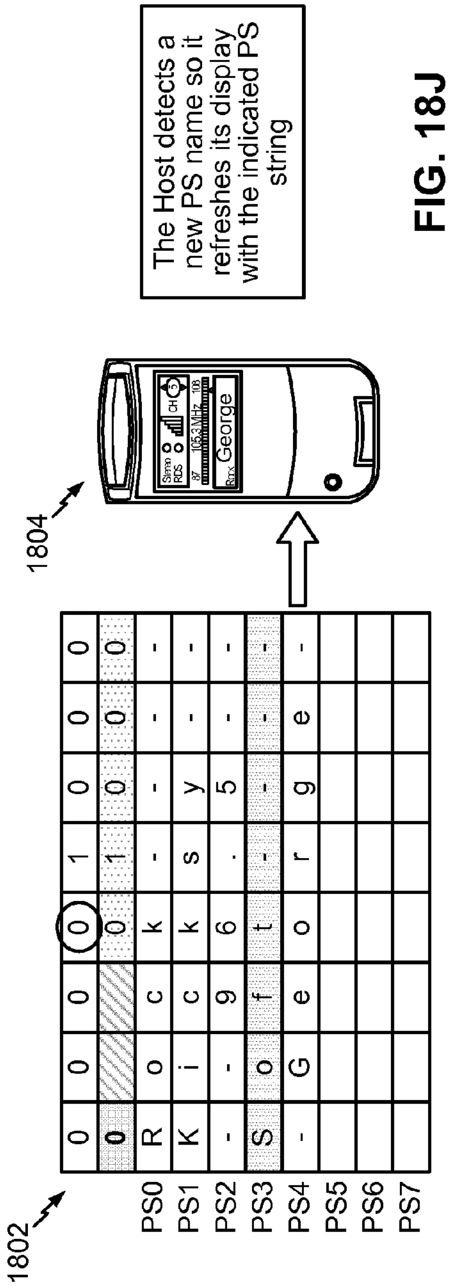

Turning to FIG. 18J, after a couple of minutes the commercial break is over and a song starts to play. Transceiver core 202 receives RDS group type 0A segments 0-3 that create "George". This string is placed in PS table 1802, the corresponding PS bit is set, and the update flag is set to new ("0").

It should be noted that the RDS group type 0 data processing feature was tested with a real life broadcast. During a period of time (~10 minutes), a local broadcaster transmitted 2,973 group type 0A during a Song1→Commercial Break→Song2 sequence. With the RDSPSEN feature enabled, transceiver core 202 sent 49 PS tables to host processor 204.

If host processor 204 wishes to process RDS group type 0A itself, it could configure RDS group filter 914 (see FIG. 9) to route all the group type 0A packets. In this example, host processor 204 would have received 2,973 group type 0A packets. Host processor 204 would then have to spend processor time validating and assembling the program service names. In this example, the savings in host processor "interrupts" using the RDS group type 0 data processing feature would have been 98.4%.

Still referring to group type 0 data, host system 200 may also provide for static program service names. The design intent of the program service may be to provide a label for the receiver preset which is invariant, since receivers incorporating the alternative frequency (AF) feature will switch from one frequency to another in following a selected program. In Europe, the PS name of a tuned service is inherently static. Transceiver core 202 uses the same PS table event to notify host processor 204 of a new program service name. Host processor 204 can retrieve the PS table at anytime.

Figure 19A:
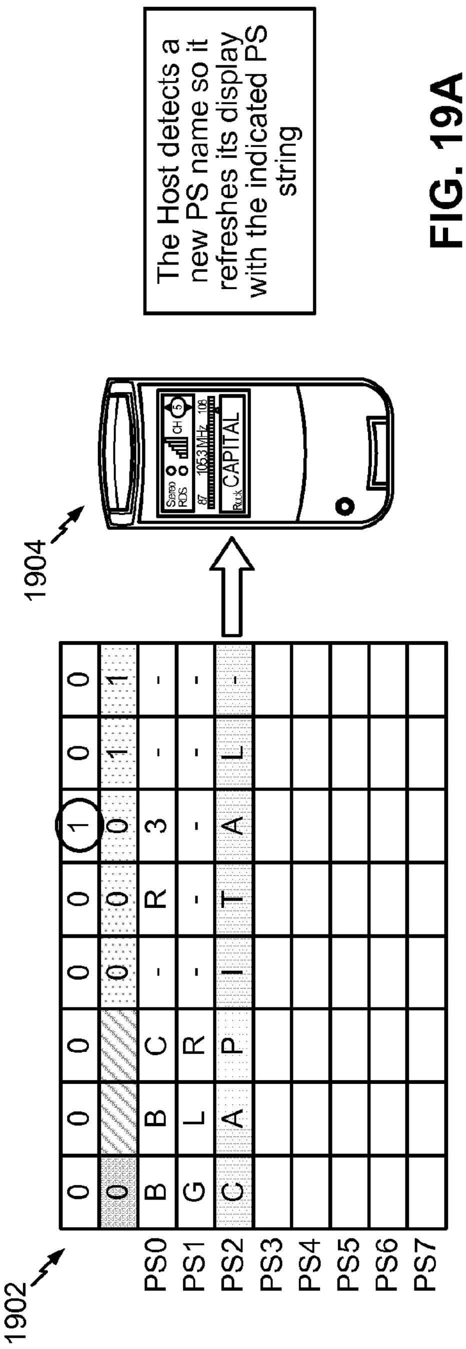
FIGS. 19A to 19B are conceptual diagrams illustrating an example of static PS name data and corresponding display text on a host processor.
Figure 19B:
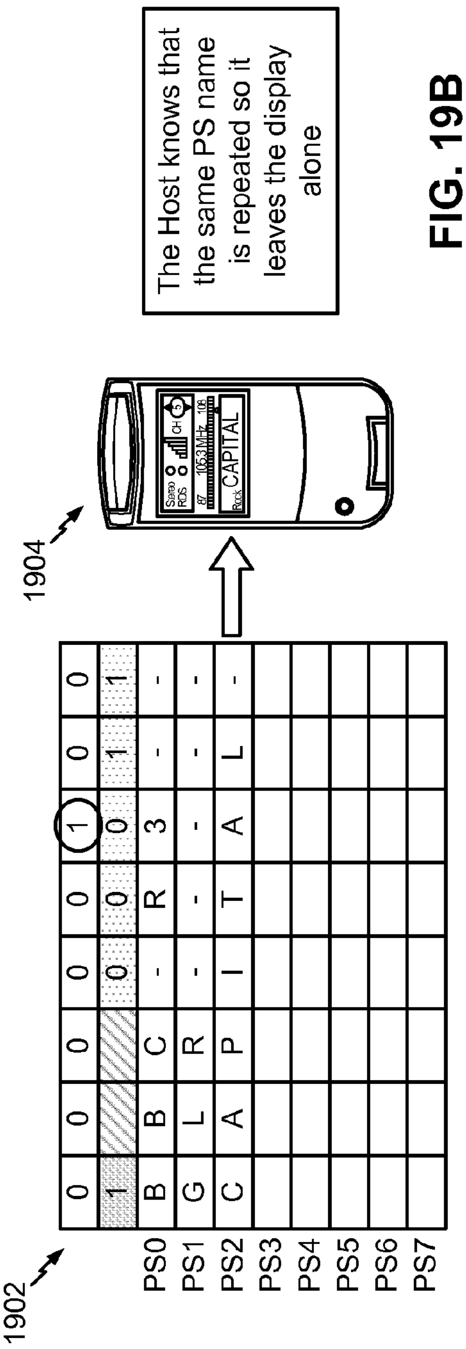

FIGS. 19A to 19B are conceptual diagrams illustrating an example of static PS name data and corresponding display text on host processor 204. In this example, a European user tunes to a new channel ("CAPITAL"). In each of FIGS. 19A to 19B, element 1902 corresponds with the PS name table and element 1904 corresponds with the host display.

In FIG. 19A, which can be seen to correspond with a first event, host processor 204 tunes transceiver core 202 to a new frequency. Transceiver core 202 receives RDS group type 0A segments 0-3 that create "CAPITAL". This string is placed in PS table 1902, the corresponding PS bit is set, and the update flag is set to new ("0"). The current program type is also filled in. Host processor 204 receives the PS table event and updates its display 1904.

In FIG. 19B, which can be seen to correspond with a next event, transceiver core 202 receives sequential segments 0-3 which creates an 8-character string that matches an element already in PS table 1902. The repeated PS bit is set and the update flag is set to repeat ("1").

In this regard, host processor 204 leaves the repeat program service name on its display 1904 until it receives another PS table event that has the update flag set to new. This would occur if the traffic announcement (TA) field changes or if host processor 204 tunes to a different station.

Another aspect of group type 0 data relates to alternative frequency (AF) list information. Transceiver core 202 may determine whether an RDS group has a group type 0 and whether there is a change in AF list information, so that an interrupt can be asserted to host processor 204. In one example, transceiver core 202 will extract the AF list from group type 0A and only when the list changes, will transceiver core 202 provide the AF list in a host control interface (HCI) event. Host processor 204 could use this list to manually tune the FM radio to an alternative frequency. In addition, if host processor 204 receives an AF list for the currently tuned station, it can enable an AF jump search mode if the received signal strength goes below a certain threshold. To enable the RDS alternative frequency list feature, host processor 204 can set the RDSAFEN bit in the ADVCTRL register.

The following generally applies to AF list information according to one aspect of the disclosure:

- Only AF Method A (group 0A) is supported.
- Any LF/MF frequencies are not included in the AF list sent to host processor 204.
- AF codes in Enhanced Other Network (EON) group type 14A are not supported.
- The AF list event contains the currently tuned frequency, program identification (PI) code, the number of AFs in the list, and the list of AFs.

Figure 20:
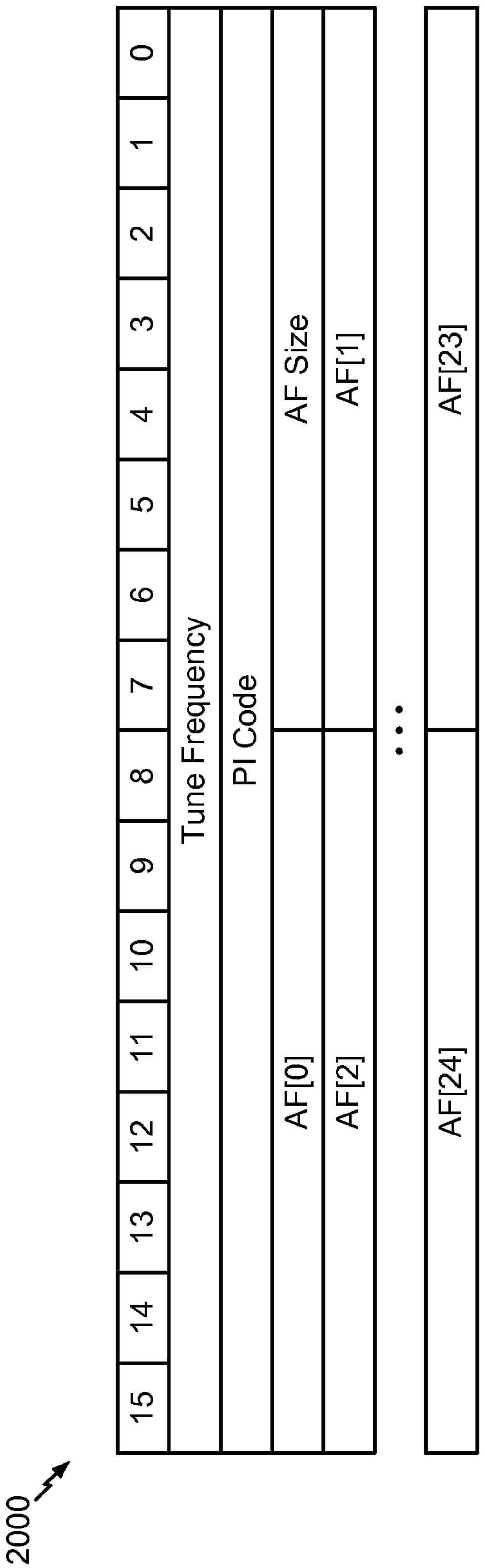
FIG. 20 is a conceptual block diagram illustrating an example of an alternative frequency (AF) list format.

FIG. 20 is a conceptual block diagram illustrating an example of an alternative frequency (AF) list format. Host processor 204 uses the RDS_AF__0/1 data transfer (XFR) modes to read AF list 2000 from transceiver core 202.

As noted above, group processing component 918 (see FIG. 9) may also include RDS group type 2 data processor 920, which will now be described in greater detail. RDS group type 2 data processor 920 may determine whether an RDS group has a group type 2 and whether there is a change in radio text (RT) information for the RDS group, so as to assert an interrupt to the host processor when such a determination is positive. RT is typically considered to be a secondary feature of RDS, and allows radio broadcasters to transmit up to 64 characters of information to the listener such as current artist, song title, station promotions, etc.

According to one aspect of the disclosure, transceiver core 202 may extract out the RT and provide up to a 64 character string, along with the PI and PTY, to host processor 204 only when the RT string changes. Transceiver core 202 may assemble and validate the radio text character string, and when the string changes, transceiver core 202 interrupts host processor 204, if RDSRTINT is enabled. Host processor 204 may then read the radio text by using the RDS_RT__0/1/2/3/4 data transfer (XFR) modes. Host processor 204 may only need to output the string on its display. The radio text may end with a carriage return (0x0D) but some broadcasters pad the string with spaces (0x20). To enable the RDS group type 2 data processing feature, host processor 204 can set the RDSRTEN bit in the ADVCTRL register.

Figure 21:
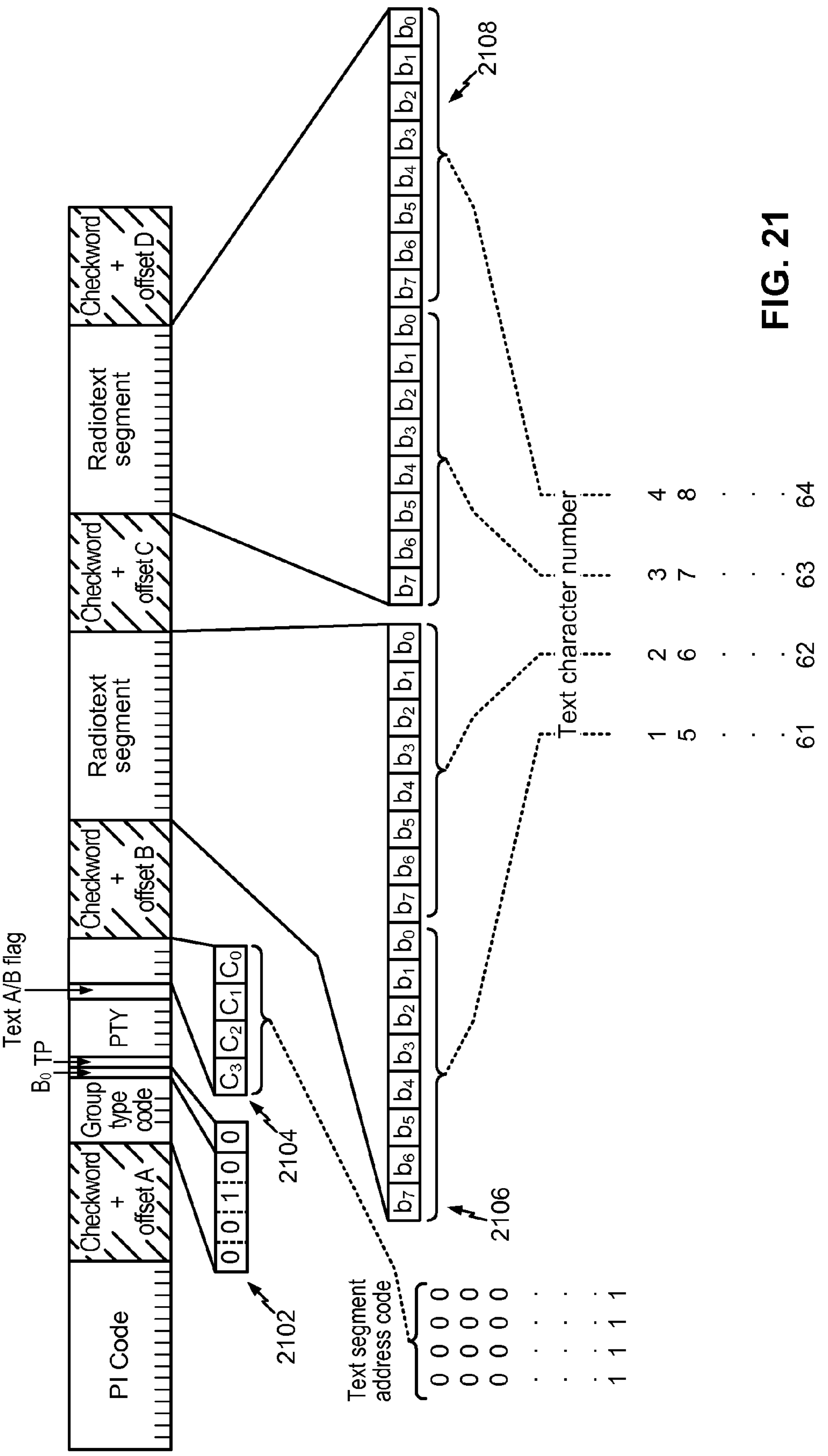
FIG. 21 is a conceptual block diagram illustrating an exemplary format of RDS radio text for group type 2A.
Figure 22:
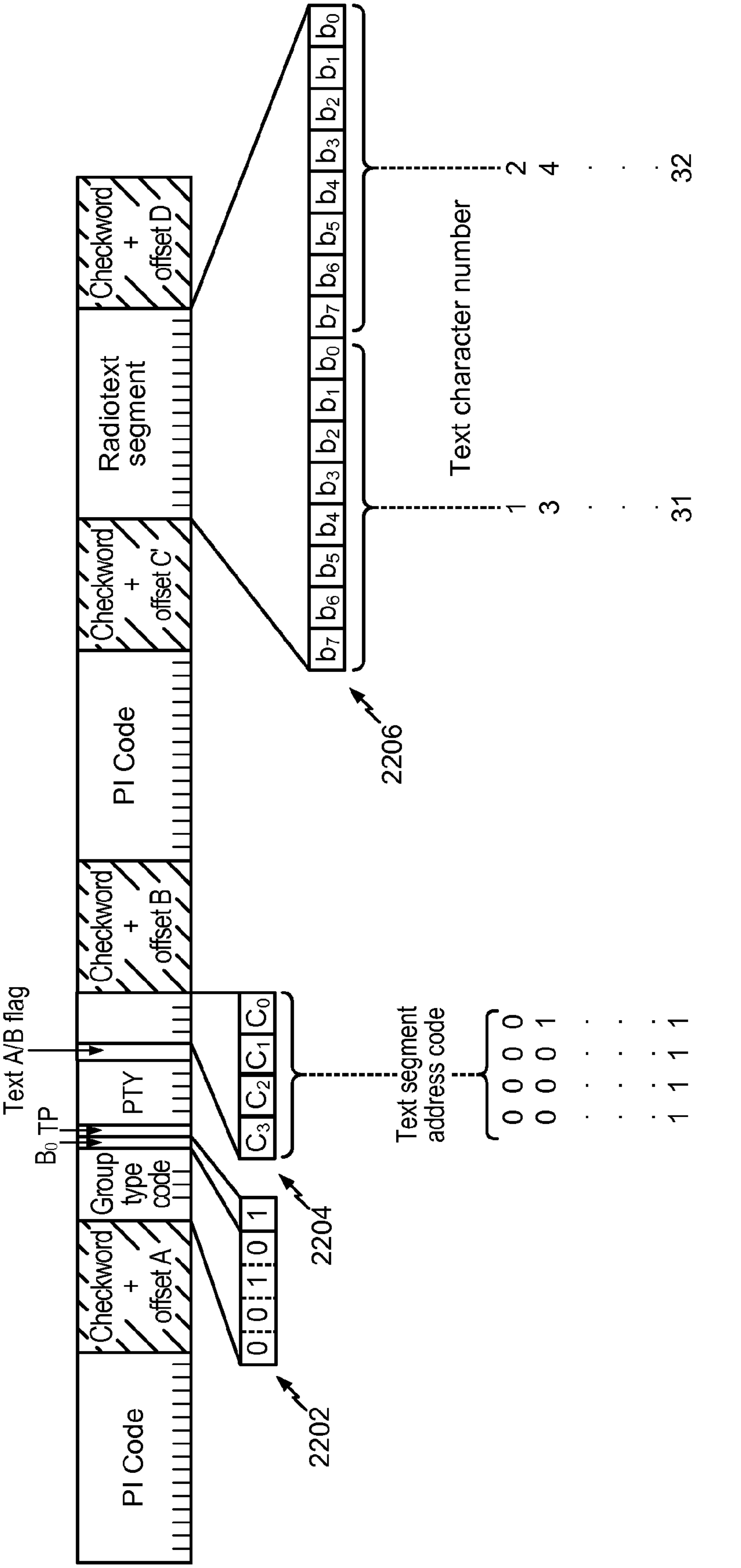
FIG. 22 is a conceptual block diagram illustrating an exemplary format of RDS radio text for group type 2B.

FIG. 21 is a conceptual block diagram illustrating an exemplary format of RDS radio text for group type 2A. It shows, among other data, group type code 2102, text segment address code 2104, and radio text segments 2106 and 2108. FIG. 22, on the other hand, is a conceptual block diagram illustrating an exemplary format of RDS radio text for group type 2B. It shows, among other data, group type code 2202, text segment address code 2204, and radio text segment 2206.

It should be noted that the RDS group type 2 data processing feature was tested with a real life broadcast. During a period of time (~10 minutes), a local broadcaster transmitted 3,464 group type 2A during a Song1→Commercial Break→Song2 sequence. With the RDSRTEN advanced feature enabled, transceiver core 202 only sent three Radio Text events to host processor 204.

If RDS Block-B filter 912 (see FIG. 9) was configured to route all group type 2A, host processor 204 would have been interrupted with BFLAG 3,464 times. Host processor 204 would then have to spend processor time validating and assembling the text string. In this example, the savings in host processor "interrupts" using the RDS group type 2 data processing would have been 99.9%.

Figure 23:
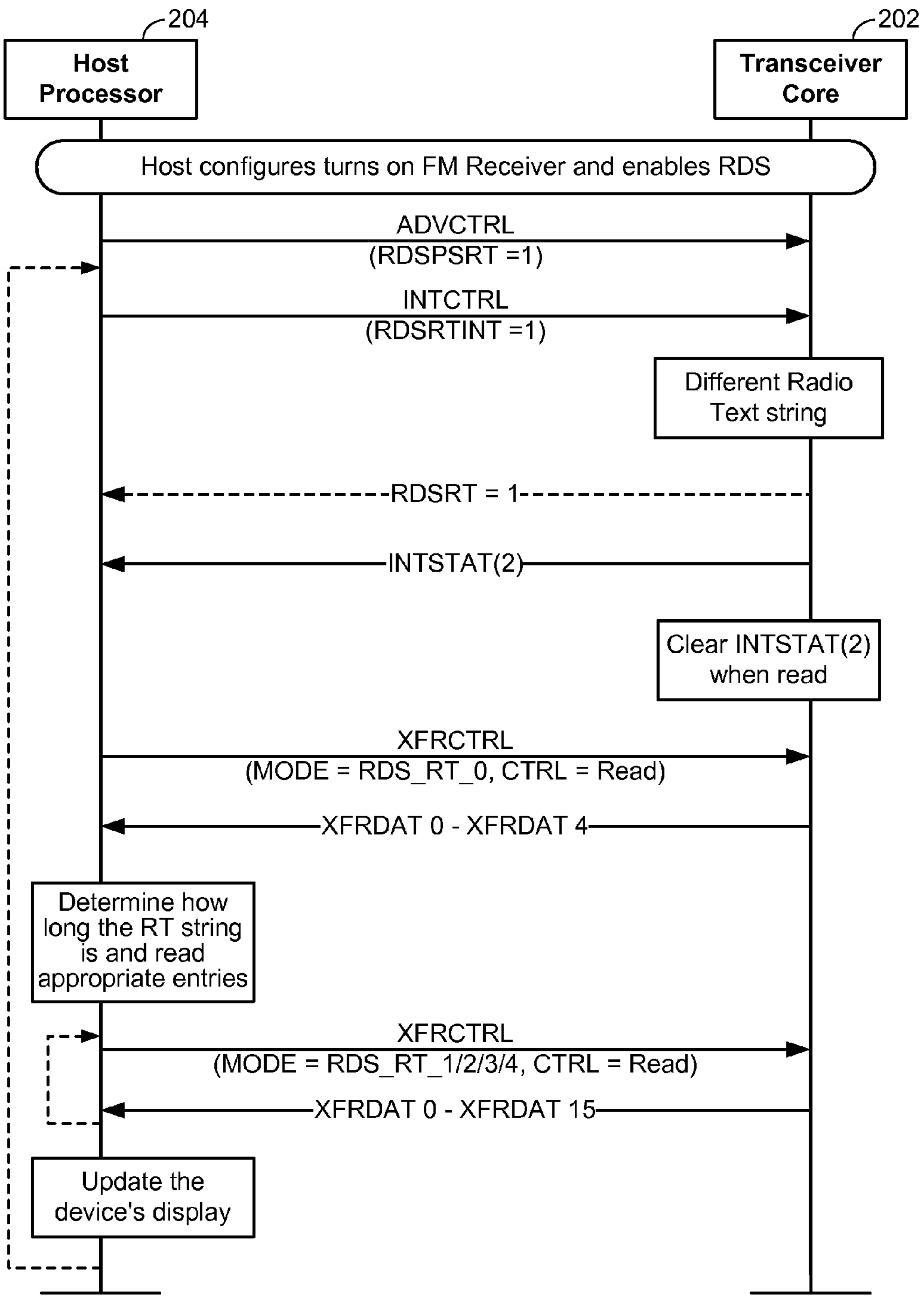
FIG. 23 is a sequence chart illustrating an example of the RDS group type 2 data processing.

FIG. 23 is a sequence chart illustrating an example of the RDS group type 2 data processing. It shows an example of how host processor 204 would enable the RDS group type 2 data processing feature and receive radio text data.

As illustrated above, according to one aspect of the disclosure, group processing component 918 (see FIG. 9) includes RDS group type 0 data processor 922 and RDS group type 2 data processor 920 for processing these specific group types. As noted above, core firmware component 904 may also include RDS group buffers 924, which will now be described in more detail. RDS group buffers 924 may store plural RDS groups before interrupting host processor 204, so as to reduce the number of interrupts for new RDS data.

Figure 24:
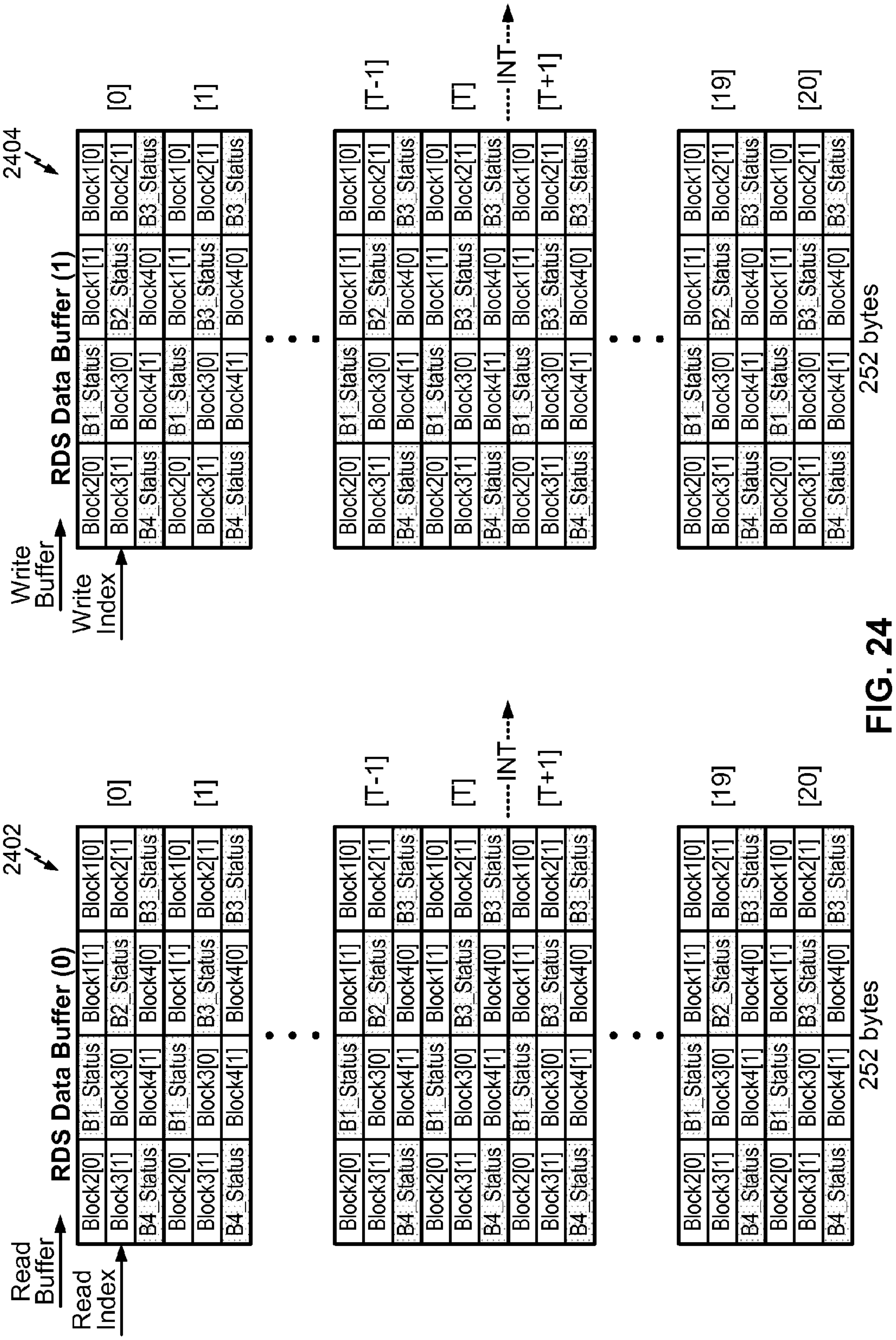
FIG. 24 is a conceptual block diagram illustrating an example of RDS group buffers.

FIG. 24 is a conceptual block diagram illustrating an example of RDS group buffers. Transceiver core 202 may contain dual RDS group buffers 2402 and 2404 (corresponding to element 924 in FIG. 9) that can hold up to 21 RDS groups. An RDS group contains, for example, 4 blocks. Each block contains two information bytes and one status byte, as previously described with reference to FIG. 8.

Host processor 204 configures the buffer threshold with the DEPTH parameter of the RDS_CONFIG data transfer (XFR) mode. When transceiver core 202 reaches the buffer threshold, it can notify host processor 204 and switch to the other buffer where it begins filling with the next RDS group. The dual RDS group buffers allow host processor 204 to read from one buffer while transceiver core 202 writes to the other. It should be noted that host processor 204 reads the contents of one RDS group buffer before transceiver core 202 fills the other buffer (to the pre-defined threshold) or else it can lose the remaining data in that buffer.

Host processor 204 can also set a flush timer to prevent groups in a buffer from becoming "stale." The flush timer can be configured by writing the FLUSHT in the RDS_CONFIG data transfer (XFR) mode.

Figure 25:
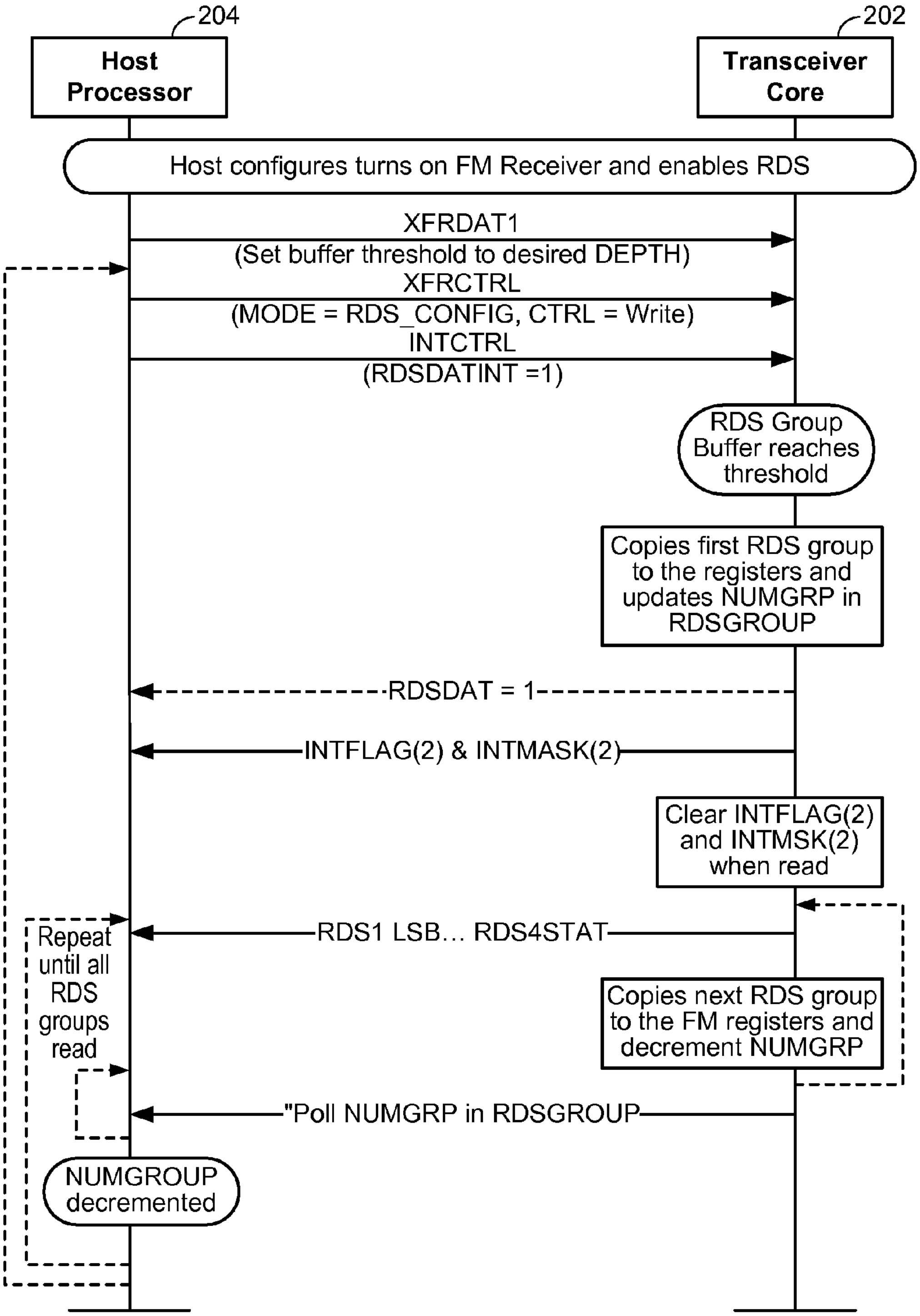
FIG. 25 is a sequence chart illustrating an example of buffering and processing RDS group data.

FIG. 25 is a sequence chart illustrating an example of buffering and processing RDS group data. As can be seen in FIG. 25, host processor 204 can read the contents of the RDS group buffers 924 of FIG. 9 by communicating with transceiver core 202.

Referring back to FIGS. 2 and 9, in accordance with one aspect of the disclosure, the following host processor controllable RDS features are provided in transceiver core 202: (i) using RDS data filter 908, host processor 204 can enable transceiver core 202 to discard uncorrectable blocks and RDS groups that consist of Block-E types, which may be used in paging systems in the United states; (ii) using RDS PI match filter 910, host processor 204 can enable transceiver core 202 to assert an interrupt whenever the program ID in block 1 and/or the bits in block 2 match a given pattern; (iii) using Block-B-filter 912, host processor 204 can enable transceiver core 202 to assert an interrupt whenever block 2 of an RDS data group matches Block-B filter parameters defined by host processor 204; (iv) using RDS group filter 914, host processor 204 can enable transceiver core 202 to only pass the specified group types; and (v) using RDS change filter 916, host processor 204 can enable transceiver core 202 to pass the specified group types only if there are changes in the group data.

The host processor controllable RDS features further include: (vi) using RDS group buffers 924, host processor 204 can configure transceiver core 202 to buffer up to 21 groups before notifying host processor 204 that there is new RDS data to be processed; (vii) using RDS group type 0 data processor 922, host processor 204 can enable transceiver core 202 to process RDS group type 0 (basic tuning and switching information) packets, where transceiver core 202 can extract out the program identification (PI) code, program type (PTY) and provide a table of program service (PS) strings, where transceiver core 202 may only send information when there are changes in the PS table (e.g., when a song changes), and where host processor 204 can also enable transceiver core 202 to extract the alternative frequency (AF) list information from RDS group type 0; and (viii) using RDS group type 2 data processor 920, host processor 204 can enable transceiver core 202 to process RDS group type 2 (radio text) packets, where transceiver core 202 can extract out the radio text (RT) and provide up to a 64 character string, along with the PI and PTY, to host processor 204 only when the RT string changes.

According to one aspect of the disclosure, transceiver core 202 has numerous filtering and data processing capabilities that can help reduce the amount of RDS processing on host processor 204. For example, buffering of the RDS group data in transceiver core 202 can reduce the number of interrupts to host processor 204. Thus, host processor 204 does not have to wake-up as often to acknowledge RDS interrupts. Filtering enables host processor 204 to only receive the desired data types and only if it has changed. This typically reduces the amount of interrupts and saves code on the host processor 204 that would have been needed to filter out the "raw" RDS data. Processing of the main RDS group types (0 and 2) in transceiver core 202 is seen to offload host processor 204. Host processor 204 would only have to display the pre-processed PS and RT strings to the user. The PS table and RT string resides in the transceiver core's memory so host processor 204 could disable all interrupts and retrieve the current strings when it wishes (e.g., coming out of screen saver mode).

FIG. 26 is a conceptual block diagram illustrating an example of a configuration for transceiver core 202 for performing various levels of RDS data processing. As shown in FIG. 26, transceiver core 202 can be configured to perform various levels of RDS processing.

Figure 27:
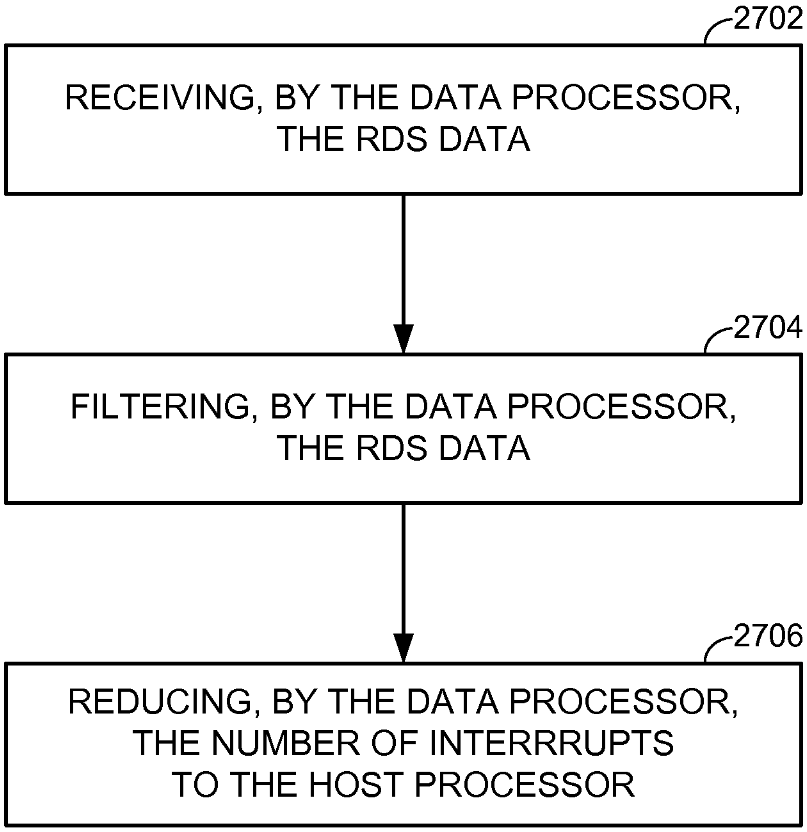
FIG. 27 is a flowchart illustrating an exemplary operation of processing RDS data utilizing a data processor.

FIG. 27 is a flowchart illustrating an exemplary operation of processing RDS data utilizing a data processor. In step 2702, RDS data is received by a data processor. In step 2704, the received RDS data is filtered by the data processor. This allows host processor 204 to receive a selected set of the RDS data. In step 2706, the number of interrupts to host processor 204 is reduced by the data processor.

According to one aspect of the disclosure, a data processor may include one or more of the components or all of the components shown in FIG. 9. In another aspect, a data processor may include a microprocessor 322 of FIG. 3, or any other one or more of the components or all of the components shown, for example, in FIG. 3. A data processor and a host processor may be implemented on the same integrated circuit, the same printed circuit board, or the same device or component. Alternatively, a data processor and a host processor may be implemented on separate integrated circuits, separate printed circuit boards, or separate devices or components. A data processor and a host processor may be distributed over different devices or components.

In one aspect, a data processor may be configured to filter the RDS data based on one or more parameters configurable by a host processor (e.g., controlled, enabled or disabled by a host processor) so that depending on the one or more parameters, the selected set of the RDS data is a subset of the RDS data. Such subset may include selected RDS groups. In another aspect, the selected set of the RDS data is a subset of the RDS data, none of the RDS data, or the entire RDS data.

A data processor may include one or more filters (e.g., blocks 908, 910, 912, 914, and 916 in FIG. 9) for filtering the RDS data. Each or some of the filters can be selectively configurable by a host processor (e.g., controlled, enabled or disabled by a host processor). For example, each or some of the filters can be configurable by a host processor independently of one or more of the other filters. A data processor may also include one or more RDS group buffers that are selectively configurable by a host processor (e.g., controlled, enabled or disabled by a host processor).

A data processor may include one or more group processing components (e.g., blocks 920 and 922 in FIG. 9) that are selectively configurable by a host processor (e.g., controlled, enabled or disabled by a host processor). For example, one or more group processing elements can be configurable by a host processor independently of one or more of the other group processing components.

In another aspect, a data processor is configured to reduce the number of interrupts to a host processor based on one or more parameters configurable by the host processor (e.g., controlled, enabled or disabled by a host processor) so that depending on the one or more parameters, the number of interrupts are reduced or not reduced.

Each of a data processor and a host processor may be implemented using software, hardware, or a combination of both. By way of example, each of a data processor and a host processor may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or any other suitable device that can perform calculations or other manipulations of information. Each of a data processor and a host processor may also include one or more machine-readable media for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processor, such as might be the case with an ASIC. Machine-readable media may also include storage external to a processor, such as a random access memory (RAM), a flash memory, a read only memory (ROM), a programmable read-only memory (PROM), an erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for a data processor and a host processor. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a host system or by a processor of a host system. Instructions can be, for example, a computer program including code.

Figure 28:
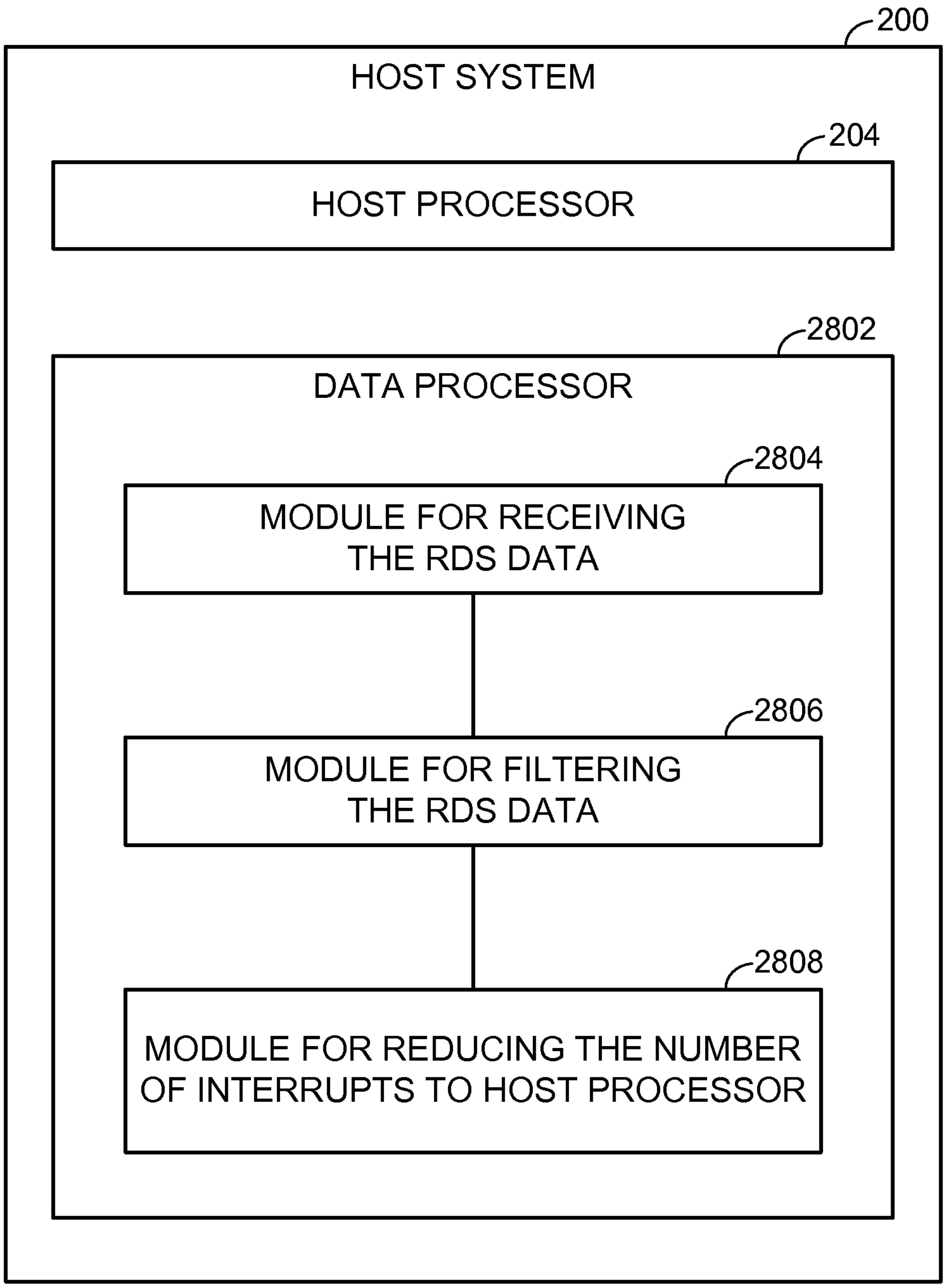
FIG. 28 is a conceptual block diagram illustrating an example of the functionality of a host system for processing RDS data.

FIG. 28 is a conceptual block diagram illustrating an example of the functionality of a host system for processing RDS data. Host system 200 includes a host processor 204 and a data processor 2802. Data processor 2802 includes a module 2804 for receiving the RDS data. Data processor 2802 further includes a module 2806 for filtering the RDS data to allow host processor 204 to receive a selected set of the RDS data. In addition, data processor 2802 includes a module 2808 for reducing the number of interrupts to host processor 204.

Those of skill in the art would appreciate that the various illustrative blocks, modules, elements, components, methods, and algorithms described herein may be implemented as electronic hardware, computer software, or combinations of both. For example, each of group processing component 918 and filter module 906 may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology. For example, the specific orders of the filters in filter module 906 of FIG. 9 may be rearranged, and some or all of the filters may be partitioned in a different way.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A host system for processing radio data system (RDS) data, comprising:

a host processor; and a data processor configured to receive RDS data and to filter the RDS data to select a set of the RDS data to transfer to the host processor, wherein the RDS data comprises a plurality of RDS groups of data, wherein filtering the RDS data reduces a number of interrupts to the host processor, and wherein filtering the RDS data includes filtering out an RDS group having an uncorrectable error.

2. The host system of claim 1, wherein each RDS group of plurality of RDS groups of data comprises a plurality of blocks of data, each block of the plurality of blocks comprising an information word and a block status byte, and wherein a block status byte of a particular block is configured to indicate a block identification and whether the particular block includes uncorrectable errors.

3. The host system of claim 1, wherein the data processor is configured to filter the RDS data based on one or more parameters configured by the host processor and wherein the selected set of the RDS data is a subset of the RDS data, none of the RDS data, or the entire RDS data.

4. The host system of claim 1, wherein the data processor is configured to reduce the number of interrupts to the host processor based on one or more parameters configured by the host processor.

5. The host system of claim 1, wherein the data processor comprises an RDS data filter configured to filter out the RDS group having the uncorrectable error or an RDS group having a Block-E group type.

6. The host system of claim 1, wherein the data processor comprises an RDS program identification (PI) match filter configured to determine whether an RDS group has a program identification matching a particular pattern and to send an interrupt to the host processor in response to determining that the RDS group has the program identification matching the particular pattern.

7. The host system of claim 1, wherein the data processor comprises an RDS Block-B filter configured to determine whether an RDS group has a block 2 entry matching a particular Block-B parameter, and to send an interrupt to the host processor in response to determining that the RDS group has the block 2 entry matching the particular Block-B parameter.

8. The host system of claim 1, wherein the data processor comprises an RDS group filter configured to filter out an RDS group having a group type matching a particular group type.

9. The host system of claim 1, wherein the data processor comprises an RDS change filter configured to filter out an RDS group having RDS group data which has not changed.

10. The host system of claim 1, wherein the data processor is further configured to send an interrupt to the host processor in response to determining that a group type of an RDS group is group type 0 and program service (PS) information for the RDS group is different from previous PS information for the RDS group.

11. The host system of claim 1, wherein the data processor is further configured to send an interrupt to the host processor in response to determining that a group type of an RDS group is group type 0 and alternative frequency (AF) list information associated with the RDS group is different from previous AF list information associated with the RDS group.

12. The host system of claim 1, wherein the data processor is further configured send an interrupt to the host processor in response to determining that a group type of an RDS group is group type 2 and radio text (RT) information for the RDS group is different from previous RT information for the RDS group.

13. The host system of claim 1, wherein the data processor comprises a memory buffer configured to store a particular RDS group before interrupting the host processor based on the particular RDS group.

14. The host system of claim 1, further comprising:

an interrupt control register comprising a first bit; and an interrupt status register, corresponding to the interrupt control register, wherein the interrupt status register comprises a second bit and wherein an interrupt is sent to the host processor based on the first bit.

15. A data processor for processing radio data system (RDS) data, comprising:

a filter module configured to receive RDS data and to filter the RDS data to select a set of the RDS data to transfer to a host processor, wherein the RDS data comprises a plurality of RDS groups of data, wherein filtering the RDS data reduces a number of interrupts to the host processor, and wherein filtering the RDS data includes filtering out an RDS group having an uncorrectable error.

16. The data processor of claim 15, wherein the filter module comprises one or more filters selectively configured by the host processor.

17. The data processor of claim 15, wherein the data processor further comprises one or more buffers configured to store some or all of the plurality of RDS groups of data to reduce the number of interrupts to the host processor.

18. The data processor of claim 15, further comprising:

one or more group processing components selectively configured by the host processor.

19. A host system for processing radio data system (RDS) data, comprising:

a host processor; and a data processor comprising:

means for receiving RDS data; and means for filtering the RDS data to select a set of the RDS data to transfer to the host processor, wherein the RDS data comprises a plurality of RDS groups of data, wherein filtering the RDS data reduces a number of interrupts to the host processor, and wherein filtering the RDS data includes filtering out an RDS group having an uncorrectable error.

20. The host system of claim 19, wherein the means for filtering comprises one or more filters selectively configured by the host processor.

21. The host system of claim 19, wherein the means for filtering is configured to filter the RDS data based on one or more parameters configured by the host processor and wherein the selected set of the RDS data is a subset of the RDS data, none of the RDS data, or the entire RDS data.

22. A method of processing radio data system (RDS) data utilizing a data processor, the method comprising:

receiving, by the data processor, RDS data; and filtering, by the data processor, the RDS data to select a set of the RDS data to transfer to a host processor, wherein the RDS data comprises a plurality of RDS groups of data, wherein filtering the RDS data reduces a number of interrupts to the host processor, and wherein filtering the RDS data includes filtering out an RDS group having an uncorrectable error.

23. The method of claim 22, wherein the filtering comprises filtering the RDS data based on one or more parameters configured by the host processor and wherein the selected set of the RDS data is a subset of the RDS data, wherein the subset of the RDS data comprises selected RDS groups.

24. A non-transitory machine-readable medium including instructions for processing radio data system (RDS) data within a data processor, the instructions comprising code for:

receiving, by the data processor, the RDS data; and filtering, by the data processor, the RDS data to select a set of the RDS data to transfer to a host processor, wherein the RDS data comprises a plurality of RDS groups of data, wherein filtering the RDS data reduces a number of interrupts to the host processor, and wherein filtering the RDS data includes filtering out an RDS group having an uncorrectable error.

25. The host system of claim 1, further comprising:

a group processing component, configured to:

assemble and validate program service (PS), ratio text (RT), or alternative frequency (AF) List strings; and provide the assembled and validated strings to the host processor.

26. The host system of claim 1, wherein the data processor is configured to discard, based on a first register value, the RDS group having the uncorrectable error and to store in a buffer, based on a second register value, the RDS group having the uncorrectable error.

27. The data processor of claim 15, wherein the filter module is configured to discard, based on a first register value, the RDS group having the uncorrectable error and to store in a buffer, based on a second register value, the RDS group having the uncorrectable error.

* * * * *